(12) United States Patent
Stott et al.

(10) Patent No.: US 10,531,614 B2
(45) Date of Patent: Jan. 14, 2020

(54) LIVING PLANT DISPLAY AND STORAGE SYSTEM, APPARATUS AND METHOD

(71) Applicant: Poppin Pods Australia Pty Ltd, Glenorie (AU)

(72) Inventors: Adam Stott, Glenorie (AU); Kerry Stott, Glenorie (AU); Brad Stebbing, Glenorie (AU)

(73) Assignee: POPPIN PODS AUSTRALIA PTY LTD, Glenorie (AU)

( * ) Notice: Subject to any disclaimer, the term of this patent is extended or adjusted under 35 U.S.C. 154(b) by 276 days.

(21) Appl. No.: 14/772,162

(22) PCT Filed: Mar. 3, 2014

(86) PCT No.: PCT/AU2014/000196
§ 371 (c)(1),
(2) Date: Sep. 2, 2015

(87) PCT Pub. No.: WO2014/134662
PCT Pub. Date: Sep. 12, 2014

(65) Prior Publication Data
US 2016/0029572 A1    Feb. 4, 2016

(30) Foreign Application Priority Data

Mar. 4, 2013 (AU) .................................. 2013900722
Aug. 23, 2013 (NZ) ......................................... 614681

(51) Int. Cl.
*A01G 9/02* (2018.01)
*A01G 9/029* (2018.01)
(Continued)

(52) U.S. Cl.
CPC ............. *A01G 9/02* (2013.01); *A01G 9/0297* (2018.02); *A01G 9/04* (2013.01); *A01G 9/045* (2013.01);
(Continued)

(58) Field of Classification Search
CPC .......... A01G 9/02; A01G 9/027; A01G 9/028; A01G 9/0295; A01G 9/0297; A01G 9/045; A01G 9/04; A01G 27/02
(Continued)

(56) References Cited

U.S. PATENT DOCUMENTS 3,142,133 A * 7/1964 Brooks ................... A01G 9/104
206/423
3,866,351 A * 2/1975 Cobia ...................... A01G 9/04
47/81
(Continued)

FOREIGN PATENT DOCUMENTS

CN         102084790        6/2011
WO         2012167314 A1    12/2012

OTHER PUBLICATIONS

International Search Report and Written Opinion for PCT/AU2014/000196.
(Continued)

*Primary Examiner* — Lisa L Tsang
(74) *Attorney, Agent, or Firm* — McClure, Qualey & Rodack, LLP

(57) ABSTRACT

A new or improved modular plant display and storage system that reduces the risks of plants tipping over and of spillage of plant and soil (or other growing medium) out the top of the pot, as well as the risk of water (and soil/growing medium) seepage and mess from the bottom of the pot. The invention can house potted plants without the need to re-pot or transplant the plants into growing medium that sits within the modular structure.

14 Claims, 24 Drawing Sheets

(51) Int. Cl.
*A01G 9/04* (2006.01)
*A01G 13/02* (2006.01)
*A01G 13/04* (2006.01)
*A01G 25/14* (2006.01)

(52) U.S. Cl.
CPC .............. *A01G 9/022* (2013.01); *A01G 9/023* (2013.01); *A01G 9/024* (2013.01); *A01G 9/027* (2013.01); *A01G 13/0243* (2013.01); *A01G 13/0281* (2013.01); *A01G 13/04* (2013.01); *A01G 25/14* (2013.01)

(58) Field of Classification Search
USPC ...... 47/65.5, 66.1, 66.5, 79, 85, 86, 39, 48.5
See application file for complete search history.

(56) References Cited

U.S. PATENT DOCUMENTS

| | | | | |
|---|---|---|---|---|
| 4,173,097 A * | 11/1979 | Staby | ............... | A01G 9/021 47/65.5 |
| D257,529 S * | 11/1980 | Raap | ............... | 47/59 R |
| D323,415 S * | 1/1992 | Iverson | ............... | D11/156 |
| 5,094,060 A | 3/1992 | Caird | | |
| D328,725 S * | 8/1992 | Deutschmann, Sr. | ............ | 47/75 |
| 5,613,605 A | 3/1997 | Angeles et al. | | |
| 5,644,867 A * | 7/1997 | Gay | ............... | A01G 9/04 47/65.6 |
| 5,761,848 A * | 6/1998 | Manlove | ............... | A01G 9/10 47/65.5 |
| 6,526,693 B2 * | 3/2003 | Cochran | ............... | A01G 9/028 47/33 |
| 6,851,221 B2 * | 2/2005 | Layt | ............... | A01G 9/028 47/85 |
| 6,955,008 B2 * | 10/2005 | Rose | ............... | A01G 9/02 47/80 |
| 7,000,351 B2 * | 2/2006 | Baumann | ............... | A01G 27/04 47/32.7 |
| 7,069,691 B2 * | 7/2006 | Brooke | ............... | A01G 9/028 47/59 R |
| 7,624,535 B2 * | 12/2009 | Schmidt | ............... | A01G 9/021 206/423 |
| 7,673,416 B2 * | 3/2010 | Smith | ............... | A01G 9/02 47/66.5 |
| 8,434,261 B2 * | 5/2013 | Nobbe | ............... | A01G 9/021 47/65.7 |
| 8,510,987 B2 * | 8/2013 | Schmidt | ............... | A01G 9/021 47/65.5 |
| 8,959,834 B2 | 2/2015 | Hashimoto | | |
| 2004/0251703 A1 * | 12/2004 | Griffith | ............... | A01G 9/088 294/159 |
| 2005/0166455 A1 * | 8/2005 | Nishida | ............... | A01G 9/02 47/79 |
| 2007/0214718 A1 * | 9/2007 | Park | ............... | A01G 9/02 47/79 |
| 2008/0276530 A1 | 11/2008 | Trabka | | |
| 2012/0272573 A1 | 11/2012 | Hashimoto | | |

OTHER PUBLICATIONS

Examination report issued in corresponding Australian patent application No. 2014225277 dated Feb. 6, 2017.
Extended European Search Report dated Sep. 29, 2016.
Office Action issued in corresponding Chinese patent application (and its English translation) dated Aug. 25, 2017.

* cited by examiner

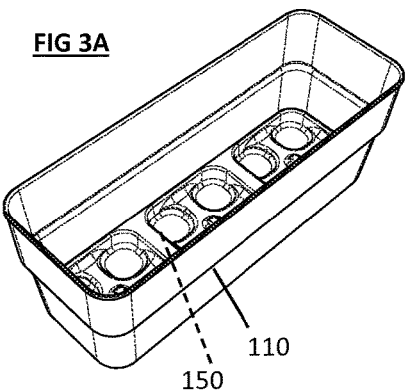
FIG 3A
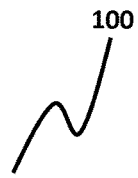
100
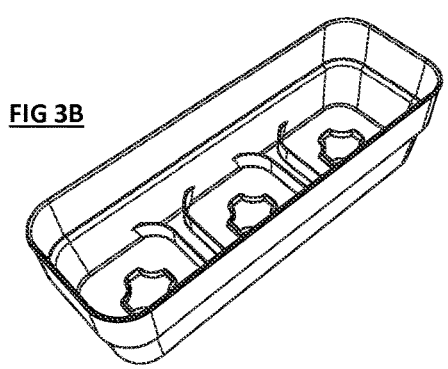
FIG 3B
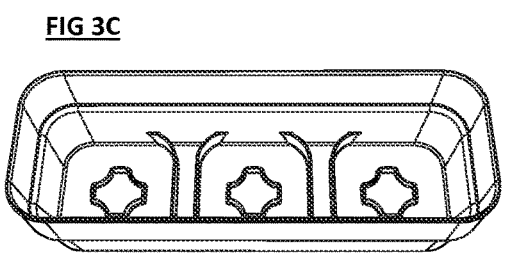
FIG 3C
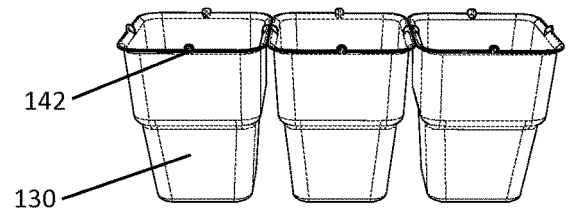
FIG 3D
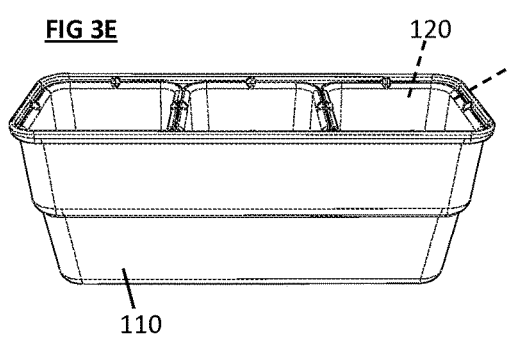
FIG 3E
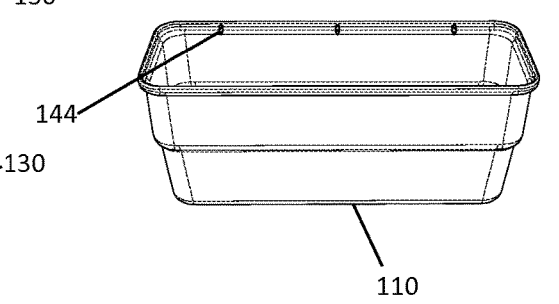
FIG 3

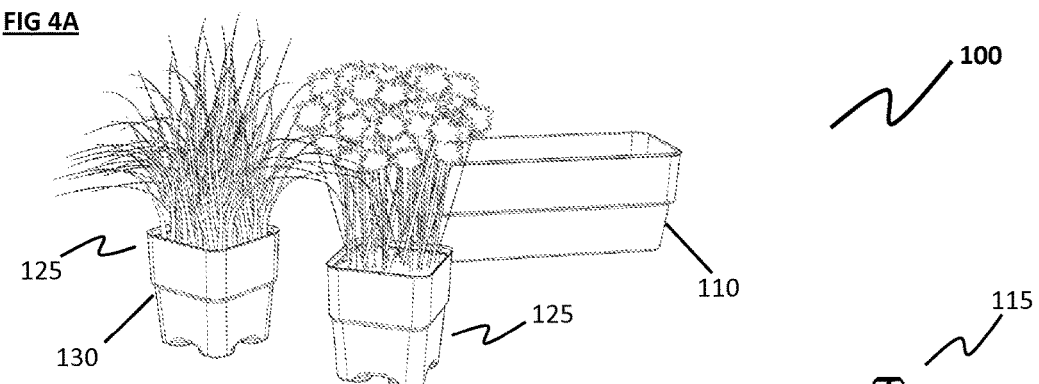
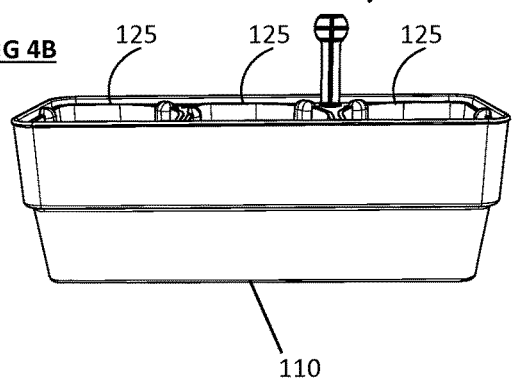
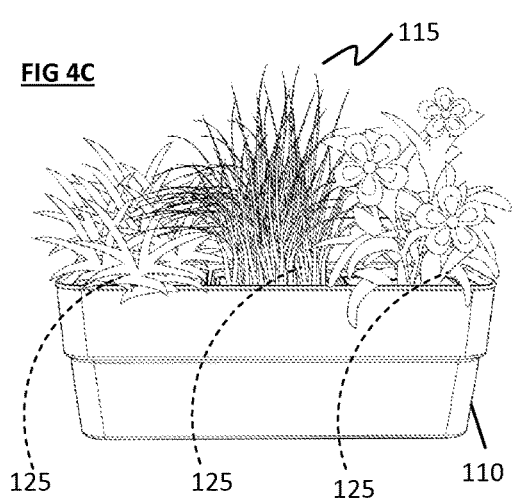
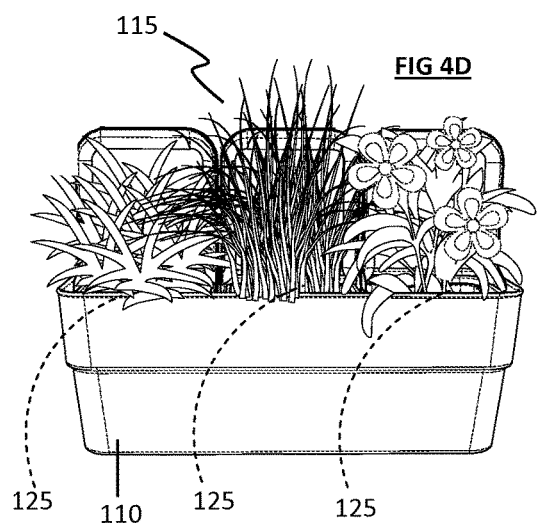
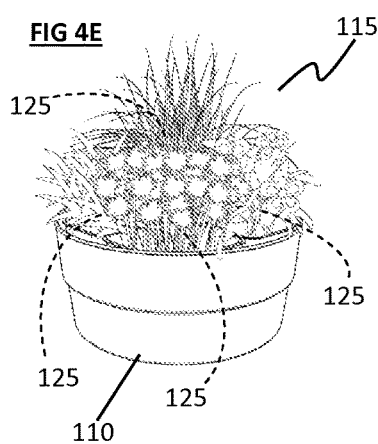
FIG 4

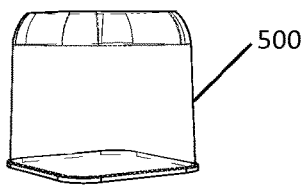
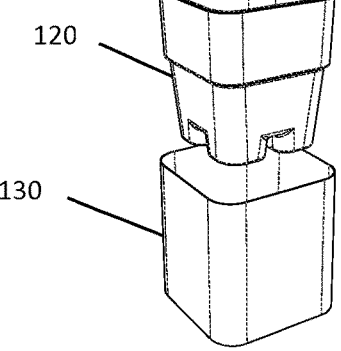
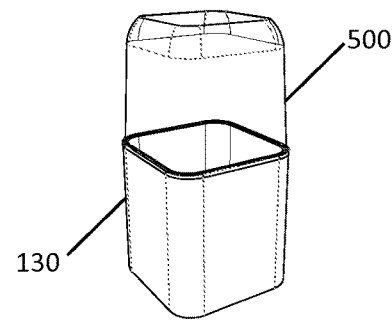
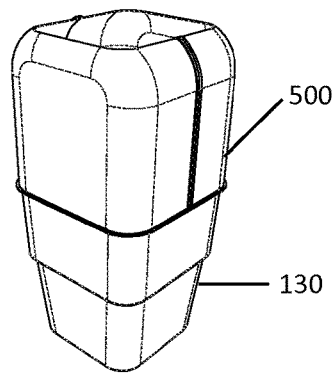
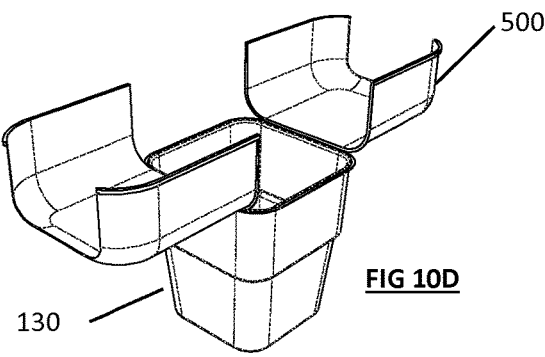
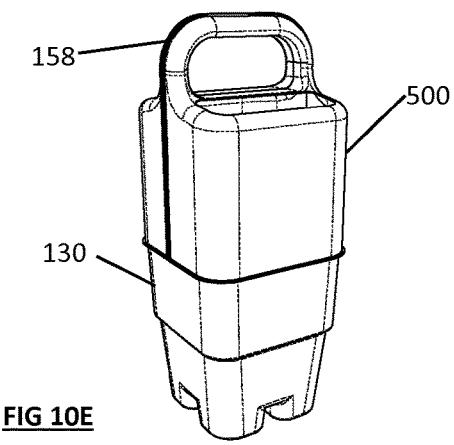
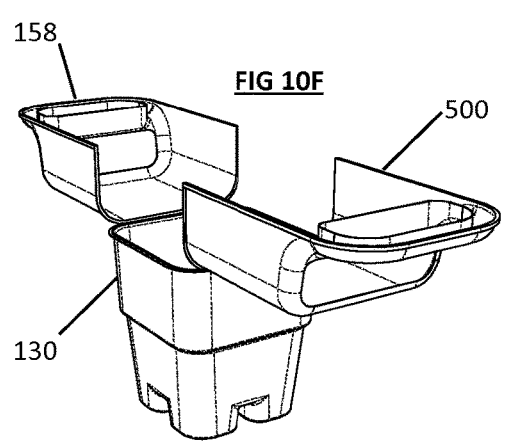
FIG 10

120

120

120

120

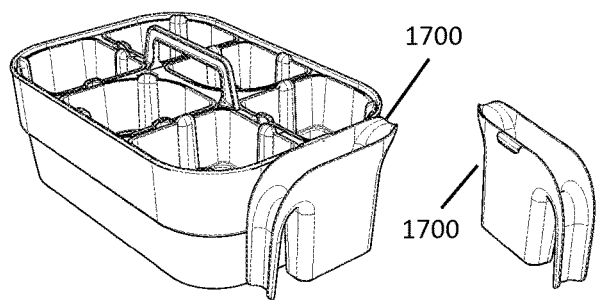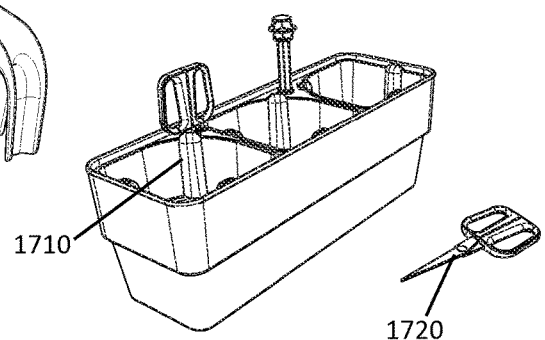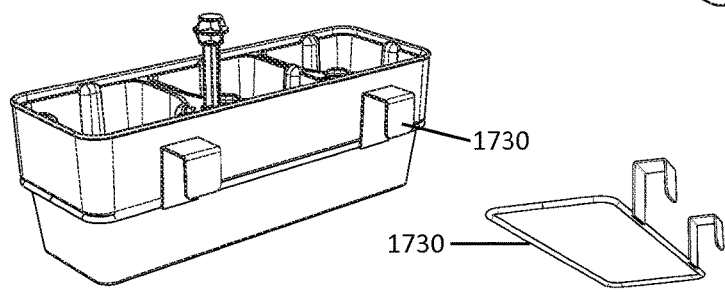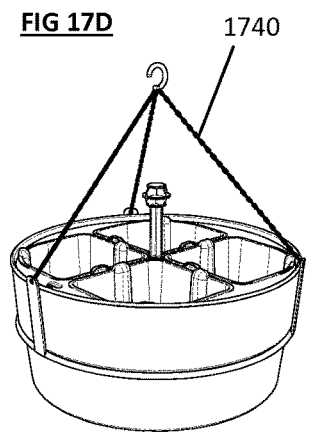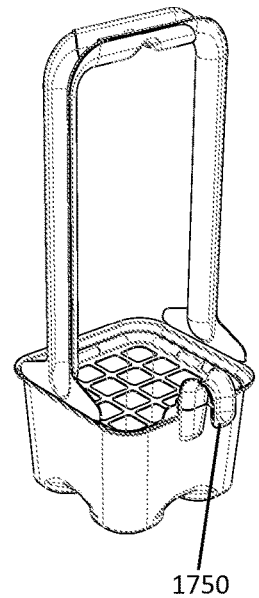
FIG 17

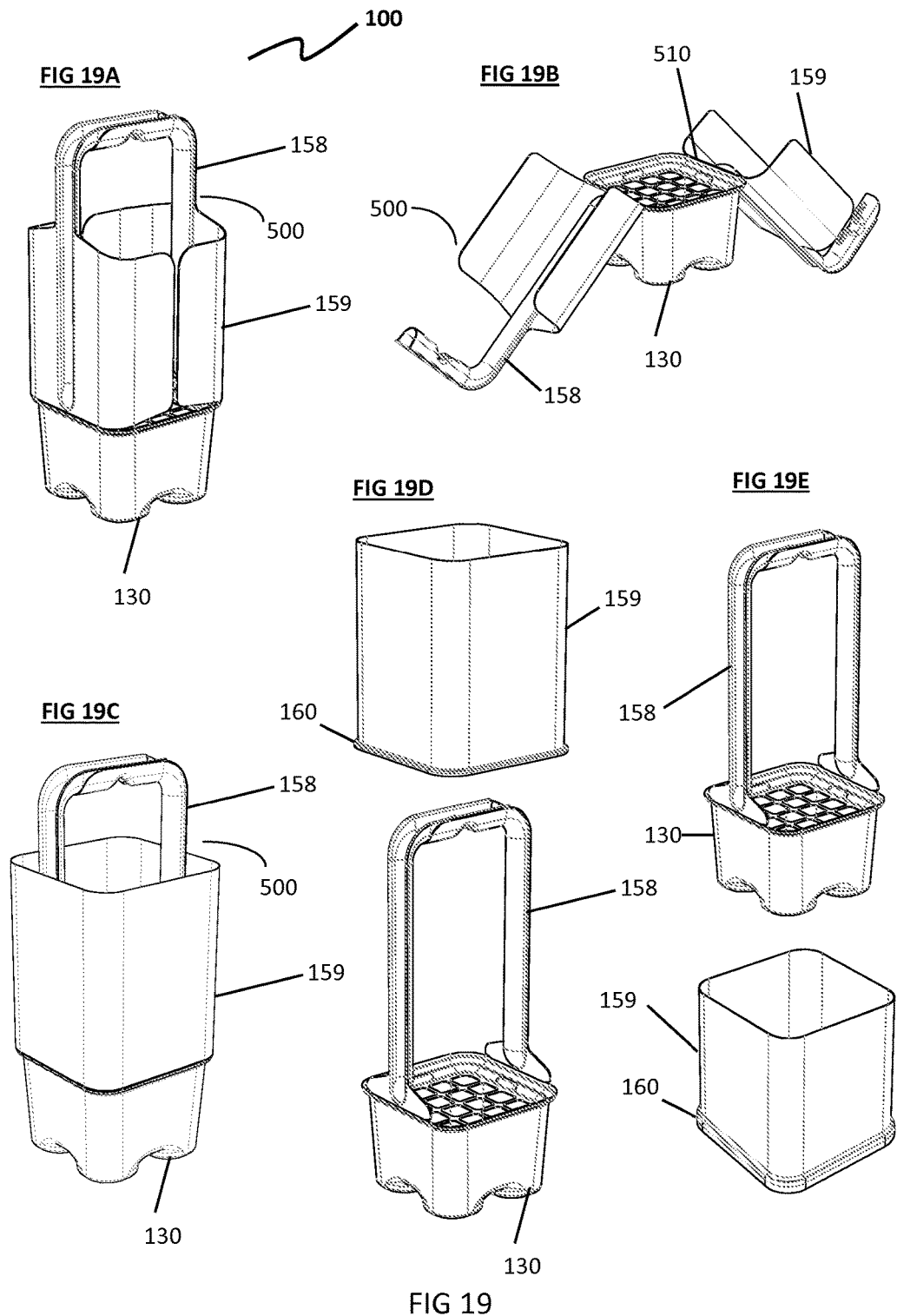

FIG 20A
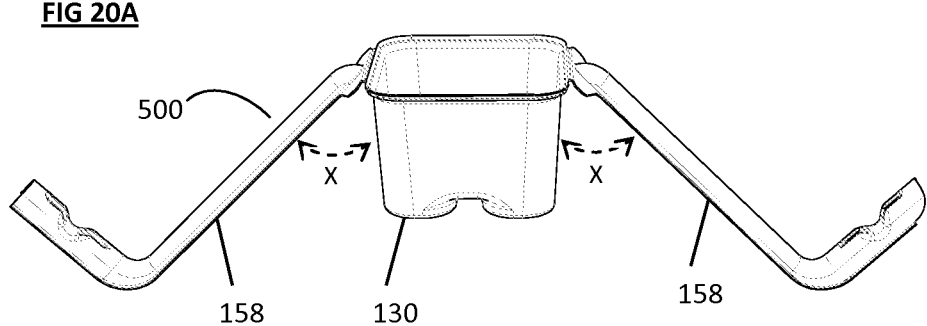
FIG 20B
FIG 20C
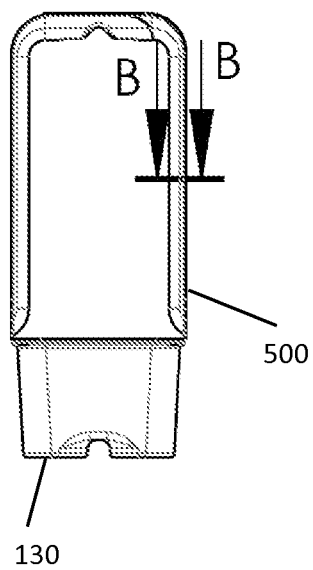
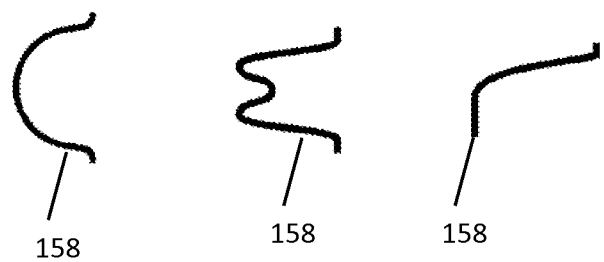
FIG 20

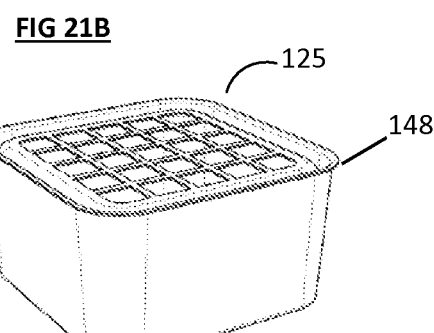
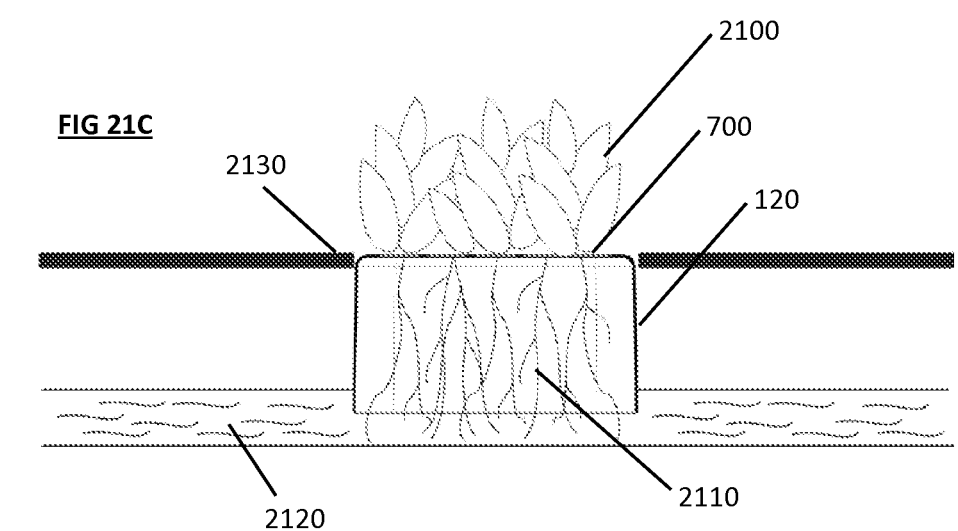
FIG 21

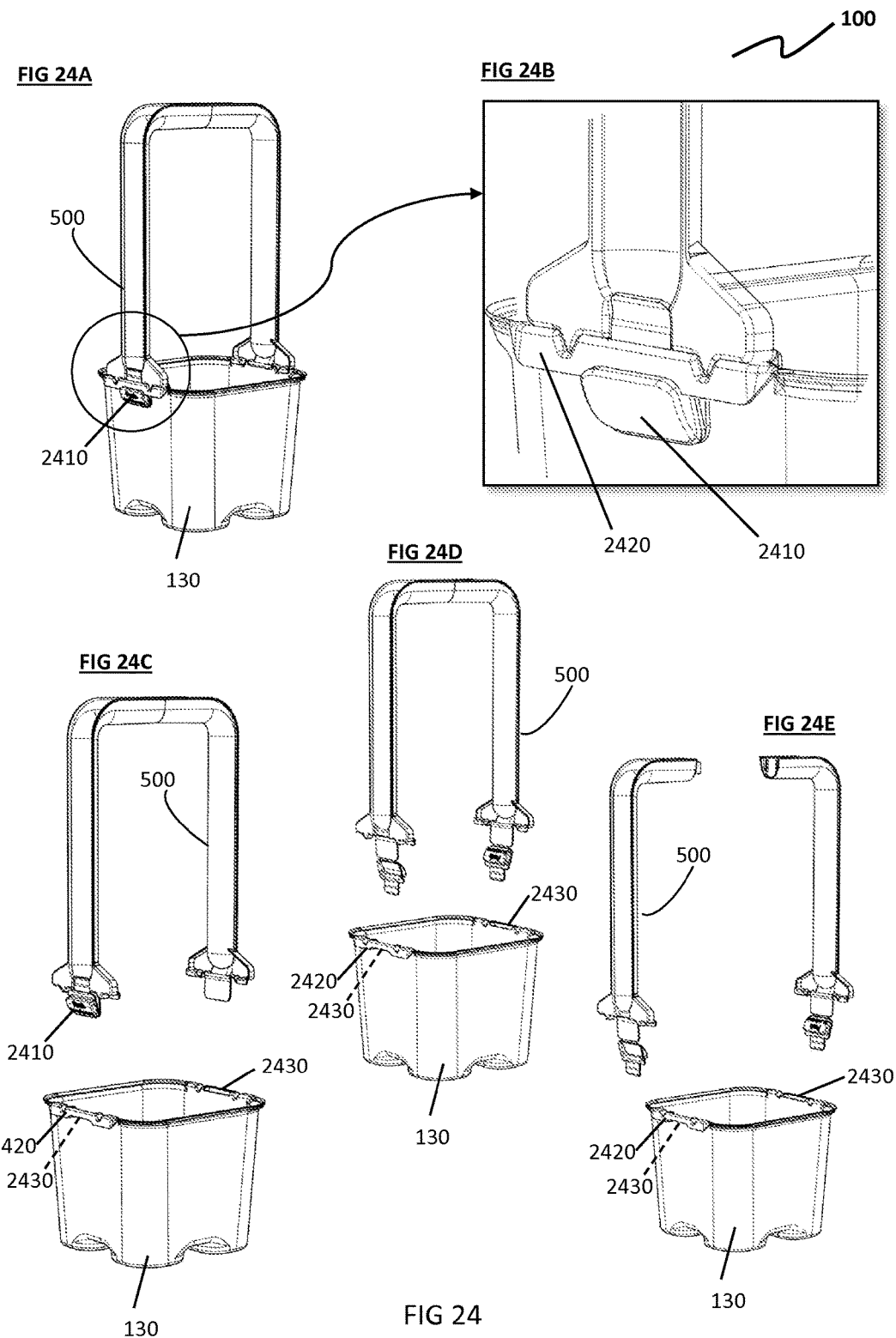

LIVING PLANT DISPLAY AND STORAGE SYSTEM, APPARATUS AND METHOD

TECHNICAL FIELD

The present invention relates to display and storage systems and apparatus for plants, and in particular for the display and storage of culinary and/or ornamental plants.

The invention has been developed primarily for use as a means for displaying and storing culinary and/or ornamental plants (consumable plants). However, it will be appreciated that the invention is not restricted to this particular use.

BACKGROUND

The market for plants can be considered as being divided into two categories:
(a) Consumable plants—namely, plants that are capable of being dissipated, wasted or spent in a relatively short time span (days to months). As such, these plants are purchased recurrently, once used up or discarded;
(b) Durable plants—namely, plants that are purchased and intended to live a relatively long period of time (years) either in pots or planted in the garden.

Consumable plants may be purchased as edible food products (e.g. cut or potted herbs, cut edible flowers or vine fruits (e.g. strawberries, tomatoes), leaf vegetables such as lettuce) and/or for ornamental purposes (e.g. cut flowers or floral arrangements).

The harvesting and post-harvest processing of consumable plants (including plant parts such as leaves, stems, core, fruit, flowers) encounter a number of risks that can affect plant quality and shelf-life. For edible plants, there is the additional risk of contamination that poses a significant food safety issue.

Of greatest concern to the life of cut plants (whether edible plants or ornamental plants) is microbial contamination. This may be arise from the use of contaminated water to spray plants and prevent dehydration and/or due to micro-organisms proliferating in the plant water and at cut plant ends.

For cut flowers, the use of floral preservatives is required to extend the life of cut flowers. Commercial preservatives include a germicide that kills micro-organisms—often a chemical such as bleach.

For cut edible plants, the use of germicides is not possible. Therefore, measures are required to minimise exposure to microbial contamination in the first place (e.g. using potable water at all times, minimising contact with contaminated surfaces and equipment or other sources of contamination, adequate sanitation and hygiene procedures) and to reduce the proliferation of micro-organisms (maintaining the cold-chain continuum from field to table).

The risk of microbial contamination of leafy vegetables (including herbs) is a significant public health issue, as identified by a joint report by the Food & Agriculture Organization of the United Nations (FAO) and the World Health Organization (WHO). The risk of contamination exists on the field, in the packing house, during transportation and storage, in the retail environment and in the home (e.g. contact with raw meat or poultry, or other non-ready-to-eat foods in the shopping basket or kitchen bench). The retail environment and transport from the retail environment to a consumer's home pose particular risks to the consumable plant parts (collectively, "retail risks"), in terms of both plant quality (physical damage) and safety (contamination).

A possible measure to reducing these risks is to sell seeds for consumers to grow consumable edible plants (e.g. leafy vegetables and herbs) for themselves. This overcomes many of the product quality and safety problems associated with harvesting and post-harvest processing. However, many consumers do not have the time, patience or appropriate space or conditions to "grow their own". Further, many lack the ability to grow sufficient (or sufficiently varied) produce to meet their needs.

Retailers often sell potted culinary plants (especially herbs), as an alternative to cut culinary plants. Potted plants address the disadvantages of growing from seed and also overcome some of the difficulties with cut plants e.g. improved freshness, decreased risk of microbial contamination. However, the edible parts of potted plants are still vulnerable to "retail risks", particularly from physical damage and/or contamination of consumable plant parts (e.g. leaves, flowers) from contact during transportation, display or storage for sale or in the consumer's shopping basket.

The risk for damage is particularly acute in retail environments that allow consumers to handle and select their own produce, and where the number of consumers handling produce is large.

Often potted plants tip over (in the trolley, a shopping bag or the car boot), further increasing the risk of contact between the edible RTE parts (e.g. leaves) and non-RTE foods or unclean surfaces. There are the added disadvantages of physical damage to leaves or other plant parts (indeed to the entire plant if a pot is completely overturned), and of dirt spilling out, leaving a mess.

There is a need for a plant display and storage apparatus/system for consumable plants that allows plants to be stored whole (uncut) and that provides protection against at least some of the risks posed by:
(a) the retail environment; and
(b) the transportation of consumable plants from the retail environment to the home.

For consumable plants (e.g. ferns, flowering plants, succulents, herbs—any plant that needs to be replenished within days to months), this includes the need for protection against damage arising from unnecessary contact or impact to the plant (including damage caused by pots turning over in the retail environment such as in the shopping trolley or during transportation to the home).

There is also a need for a plant display and storage apparatus that provides flexibility to consumers to store ready-to-consume (whether for eating or immediate ornamental display) consumable plants according to individual consumption requirements. Some plants are typically or preferentially used in larger quantity than others, so an individual consumer may purchase multiple consumable plants. Typically these are lined up along a balcony, window sill or along a wall. The consumable nature of these plants means they are often left in their original in-store pot, forming an unsightly collection of individual disposable pots. It would be useful to have a display and storage system that could allow orderly arrangement of a plurality of consumable plants even in limited space, and if the display and storage apparatus was available stocked with the consumer's choice of live, consumable plant parts to ensure availability of consumable plant parts to the consumer. This would facilitate the replenishment of stock of consumable plant parts. It would also be useful to have a plant display and storage system that provides flexibility so that the orderly arrangement of plants and decorative components of the system can be adapted to the available space or end user's wishes.

U.S. Pat. No. 3,389,499 is a modular planting wall made of interlocking roughly rectangular blocks. The blocks are hollow for filling with soil or the like as a plant growing medium. One side of the rectangle is outwardly bowed and open upwardly so that when the blocks are stacked, the bowed part forms a planting trough or pocket extending outward from the erected wall. While the planting wall is made of hollow blocks, in use it is formed of a central earth-filled core. As such, it is cumbersome and messy to replace plants. This is a disadvantage if dealing with consumable plants that are intended to be replaced frequently.

EP0604749 describes an alternative self-supporting modular structure for containing plants and flowers and allowing the vertical arrangement of flower pots. It shares the disadvantage of U.S. Pat. No. 3,389,499 in that it is cumbersome and messy to replace plants. In addition, the self-supporting structure of EP0604749 is formed by a plurality of flower pots joined together by at least one channel. The channels allow the passage of irrigation liquid from one flower pot element to another. This is not ideal in an indoor environment to have open channels of liquid, which may be messy and unsightly, can attract mosquitoes in warm climate environments.

An added disadvantage of EP0604749 is while EP0604749 provides a structure for vertically arranging flower pots, the vertical arrangement of plants is achieved by stacking flower pots on each other (each flower pot separated from another by a channel). This means that only the pots on the uppermost "layer" of the structure can house a plant. In the remaining layers, the pots receive the foot of the pot above. Accordingly, the modular structure must also extend in at least one horizontal plane in order to house more plants. This makes the structure space inefficient.

U.S. Pat. No. 5,947,306 provides a modular rack for holding a flower pot, vase and the like. It is made to receive potted plants (or a vase) rather than relying on plants to be planted into a growing medium that sits within the modular structure. The rack includes a hollow support tube that can be displayed on a flat surface or fastened onto a wall. A number of support arms are attached to the support tube, slotting into the support tube at one end of each arm. The free end of each arm has a tray fastened to it. The trays are for holding a flower pot, vase or the like.

A disadvantage of the modular rack of U.S. Pat. No. 5,947,306 is that it does not overcome the problem of having an unsightly collection of disposable pots if used to display consumable plants. Further as the disposable pots used for consumable plants are typically not substantial in size or weight, they are liable to easily tip over and spill on the tray or over the edge of the tray—for example, if the support arm is knocked or in a strong wind. The modular rack of U.S. Pat. No. 5,947,306 does not address the likelihood of mess if a plant pot falls over.

Further, each support arm of the rack of U.S. Pat. No. 5,947,306 is attached to the support tube by means of a pair of retaining slots, which are made to receive a pair of hooked retaining protuberances that extend from the end of each arm. Hooking retaining protuberances into slots is a commonly used method for securing bookshelves to a pair of supporting tubes fastened to a wall. However, this method relies on the distribution of weight (from a shelf itself and/or items placed on the shelf) for stability and to securely hold the arm to the support tube. Accordingly, this arrangement is not ideal for small and light consumable plants because the support arms could be easily dislodged from the support tube.

Yet another disadvantage of the modular rack of U.S. Pat. No. 5,947,306 is that the support tube is a tubular structure. Therefore, either it must be permanently secured to a wall (which requires a free wall) or it requires a base of sufficient breadth relative to the height of the support tube in order to stand securely. These requirements limit the options for positioning of the modular rack.

It would be useful to have a modular plant display and storage system that can house potted plants without the need to re-pot or transplant the plants into growing medium that sits within the modular structure. Unlike the prior art systems described above, however, it would be useful if the modular system secures the pots in a manner that reduces the risks of plants tipping over and of spillage of plant and soil out the top of the pot, as well as the risk of water (and soil) seepage and mess from the bottom of the pot.

U.S. Pat. No. 5,022,183 provides a flower pot carrying tray with restraining means for plural pots. The tray has restraining means (walls in the tray) to stop a pot from moving parallel to the plane of the tray bottom wall, as well as restraining means to prevent transverse movement relative to the plane of the tray bottom wall. The latter restraining means comprises a protrusion formed in the tray bottom wall to sit in registration with a pot drain hole (i.e. the protrusion extends into the pot through the pot drain hole). The protrusion has a transverse lip adapted to overlie the pot bottom so that it "hooks" the pot onto the tray. A disadvantage of this restraining means is that it hooks through the holes in a pot, allowing soil and water (mud) to seep out into the tray. A further disadvantage is that the restraining means necessarily disturb the soil in a pot both when engaging and disengaging the pot. Yet another disadvantage is that the tray of U.S. Pat. No. 5,022,183 is much more shallow in depth than the pots it is designed to carry. This means that the tray has limited capacity to capture heavy seepage (e.g. overflow from overwatering) and to limit heavy seepage from escaping beyond the tray. A better method of securing pots is required to avoid mess in handling, transporting and displaying plants, including capturing heavy seepage.

It is an object of the present invention to provide a new or alternative plant display and storage system, apparatus and method for ready-to-consume, live consumable plants that allows the orderly arrangement of one or more plants (including without limitation edible and ornamental plants). It would be an advantage if the plant display and storage system were modular so that it provided flexibility and could be adapted according to an end user's needs or wishes. It would be a further advantage if the plant display system and apparatus also reduces the risk of plants tipping over or spilling during transport and handling by a consumer. It would be a further advantage yet again if the plant display system and apparatus also addresses the risks caused by unnecessary contact to consumable plant parts (e.g. leaves, stem, flowers, core).

SUMMARY

According to an aspect of the invention there is provided a modular plant-on-display and storage (PODS) system comprising:
(a) a PODS shell capable of receiving one or more PODS apparatuses,
    wherein each PODS apparatus is engageable with the PODS shell, and
    wherein each said PODS apparatus comprises:
        i. an inner PODS device, the inner PODS device having a base and an internal volume for receiving a plant therein; an outer PODS device, the outer PODS device having an internal volume for receiving an inner PODS device, wherein the outer PODS device is deeper than the inner PODS device such that the outer PODS device has a larger internal volume than the inner PODS device, and ii. wherein the outer PODS device acts as a first barrier to seepage, collecting seepage from the inner PODS device of one or more of:
A. growing medium;
B. liquid;

(b) engagement means to retain the one or more PODS apparatuses upright within the PODS shell,
wherein the PODS shell is deeper than any PODS apparatus contained therein such that when the PODS apparatus is engaged in position within the PODS shell, the PODS shell acts as a second barrier to seepage, collecting seepage from each PODS apparatus, wherein in use the PODS shell accommodates an arrangement of one or more plants such that the PODS system provides a customisable solution for storage or display of one or more plants that retains said plants upright and collects seepage to reduce mess associated with storing or displaying a plant, wherein each PODS apparatus is removable from the PODS shell, such removal effecting removal of a plant from said arrangement, such that mess associated with removing or replacing a plant is reduced.

According to another aspect of the invention there is provided a plant-on-display and storage (PODS) method wherein the method includes the following steps:

(a) arranging one or more PODS apparatuses within a PODS shell to form a PODS structure, each PODS apparatus being engageable with the PODS shell, wherein each PODS apparatus includes:

i. an inner PODS device, the inner PODS device having a base and an internal volume for receiving a plant therein;
an outer PODS device, the outer PODS device having an internal volume for receiving an inner PODS device and
wherein the outer PODS device is deeper than the inner PODS device such that the outer PODS device has a larger internal volume than the inner PODS device, and
wherein the outer PODS device acts as a first barrier to seepage, collecting seepage from the inner PODS device of one or more of:
A. growing medium;
B. liquid;

ii. engagement means to retain the one or more PODS apparatuses upright within the PODS shell;

(b) positioning each PODS apparatus relative to engagement means so as to retain the PODS apparatus in an upright position within the PODS shell, wherein the PODS shell is deeper than any PODS apparatus contained therein such that the PODS shell acts as a second barrier to seepage, collecting seepage from each PODS apparatus, wherein arranging one or more PODS apparatuses within one or more PODS shells enables arrangement of one or more plants for storage or display, and wherein said method reduces mess associated with storing, displaying, removing or replacing a plant.

According to a further aspect of the invention there is provided a plant-on-display and storage (PODS) apparatus comprising:

(a) an inner PODS device, the inner PODS device having a base and an internal volume for receiving a plant therein;

(b) an outer PODS device, the outer PODS device having an internal volume for receiving an inner PODS device, wherein the outer PODS device is deeper than the inner PODS device such that the outer PODS device has a larger internal volume than the inner PODS device, and
wherein the outer PODS device acts as a first barrier to seepage and collects seepage from the inner PODS device of one or more of:
i. growing medium;
ii. liquid;

wherein the PODS apparatus is engageable with a PODS shell,
the PODS shell being capable of receiving one or more PODS apparatuses, each PODS apparatus for containing a plant such that in use the PODS shell accommodates a custom arrangement of one or more plants for storage or display,
wherein engagement means retain one or more PODS apparatuses upright within a PODS shell,
wherein the PODS shell is deeper than any PODS apparatus contained therein such that when the PODS apparatus is engaged in position within the PODS shell, the PODS shell acts as a second barrier to seepage, collecting seepage from each PODS apparatus,
wherein each PODS apparatus is removable from the PODS shell, such removal effecting removal of a plant from said arrangement, such that mess associated with removing or replacing a plant is reduced.

DETAILED DESCRIPTION

In a preferred embodiment, the invention thus provides a new or alternative plant display and storage (hereafter, the "plant-on-display-and-storage" or PODS) system, apparatus and method that allows the orderly arrangement of one or more plants (including, without limitation, edible and ornamental plants).

The PODS system provides flexibility so that the arrangement of one or more plants can be adapted to an end user's needs and/or wishes. This is achieved by providing a modular system of components and accessories, including modularly connectable PODS apparatuses and components for securing one or more PODS apparatuses to an external structure (e.g. a wall, a balcony, an awning).

In an embodiment, the PODS system and apparatus also addresses the risk of damage or contamination through contact to consumable plant parts (e.g. leaves, stem, flowers, core) by providing a housing that extends over and/or around the plant crown.

In an embodiment the PODS system and apparatus also reduces the risk of plants tipping over or spilling during transport and handling by a consumer.

For a better understanding of the invention and to show how it may be performed, a preferred embodiment will now be described, by way of non-limiting example only, with reference to the accompanying drawings.

FIG. 1A is an exemplary rectangular PODS structure comprising: three PODS apparatuses (each PODS apparatus comprising an inner PODS device and an outer PODS device) within an exemplary PODS shell (a rectangular window box).

FIG. 1B is the PODS shell of FIG. 1A containing PODS apparatuses that include an exemplary handle means.

FIG. 1C is the PODS shell of FIG. 1A containing an engagement means that include an alternative handle means.

FIG. 1D is an exemplary round PODS shell comprising four PODS apparatuses (each including an inner PODS device and an outer PODS device) and including the exemplary handle means of FIG. 1C, again provided on engagement means.

FIG. 1E is an exemplary rectangular PODS shell capable of housing up to six inner PODS apparatuses (each with an inner PODS device and an outer PODS device) with yet another exemplary handle means than depicted in FIG. 1C and 1D provided on engagement means.

FIG. 1F is the PODS apparatus of FIG. 1B comprising an inner PODS device and an outer PODS device secured in an upright position by alternative engagement means than depicted in FIGS. 1C to 1E. The outer PODS device includes the handle means of FIG. 1B.

FIG. 2A is the PODS structure of FIG. 1A showing an exemplary engagement means. The engagement means is similar to that depicted in FIG. 1F and is used to secure each PODs apparatus in an upright position within an exemplary rectangular PODS shell.

FIG. 2B is the PODS structure of FIG. 1B showing the same engagement means as in FIG. 2A. The PODS structure includes three PODS apparatuses (including inner and outer PODS devices, the outer PODS devices having handle means) and engagement means securing the PODS apparatuses in an upright position within an exemplary PODS shell.

FIGS. 2C to 2E depict the PODS structures of FIGS. 1C to 1E, respectively, showing an alternative engagement means to that depicted in FIGS. 2A and 2B. The engagement means is provided with a handle means to facilitate insertion and removal of PODS apparatuses from the PODS shell.

FIG. 3 shows further views of various engagement means.

FIG. 3A is a perspective view of the PODS shell of FIGS. 1A and 1B showing a removable tray along the base of the PODS shell. The tray bears recesses for receiving projections at the base of one or more PODS outer devices, inner PODS devices, or PODS apparatus.

FIG. 3B is a perspective view of a PODS shell showing a different form of engagement means than shown in FIGS. 1A and B. Projections at the base of the PODS shell extend up into the internal volume of the PODS shell to engage with depressions at the base of an outer PODS device such as the outer PODS device shown in FIG. 4A.

FIG. 3C is a plan view of the PODS shell of FIG. 3B.

FIG. 3D is an exploded front view of a PODS structure similar to that depicted in FIG. 1A. An alternative engagement means to that shown in FIG. 2 is shown, comprising projections on each outer PODS device and corresponding recesses on the PODS shell.

FIG. 3E is the PODS structure of FIG. 3D in an assembled state.

FIG. 4 shows various exemplary arrangements of a plurality of consumable (ornamental and/or edible) plants that can be achieved with PODS apparatuses and PODS shells.

FIG. 4A contains perspective views of two PODS apparatuses, each containing a plant, and a front view of a rectangular PODS shell (usable, for example, as a window box) capable of receiving three inner PODS devices.

FIG. 4B is an alternative rectangular PODS shell capable of receiving three PODS apparatuses.

FIG. 4C is a front view of the PODS shell of FIG. 4A or 4B containing an exemplary arrangement of consumable plants.

FIG. 4D is a front view of the PODS shell of FIG. 4A in which the PODS apparatus includes the handle means of FIGS. 1B and 1F.

FIG. 4E is a front view of a round PODS shell containing an exemplary arrangement of consumable plants. This PODS shell is usable, for example, as a table centrepiece.

Figure 5:
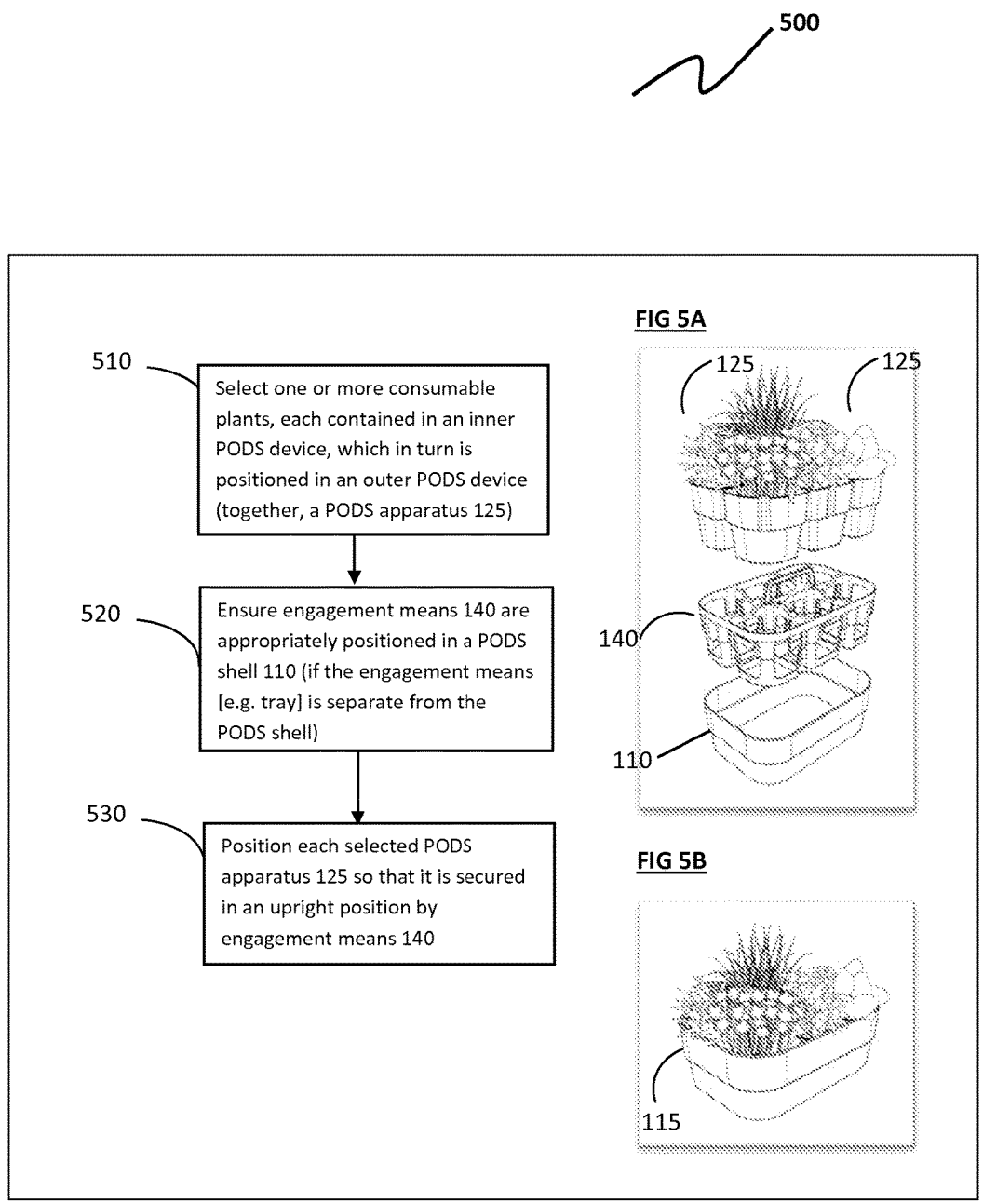

FIG. 5 is a schematic, illustrated flowchart showing a method of securing PODS apparatuses to a PODS shell via an engagement means according to exemplary embodiments.

FIG. 5A is an exploded perspective view of the PODS structure of FIG. 2E showing six PODS apparatuses, engagement means including a handle means and a rectangular PODS shell.

FIG. 5B is a perspective view of the PODS structure of FIG. 5A in an assembled state.

Figure 6:
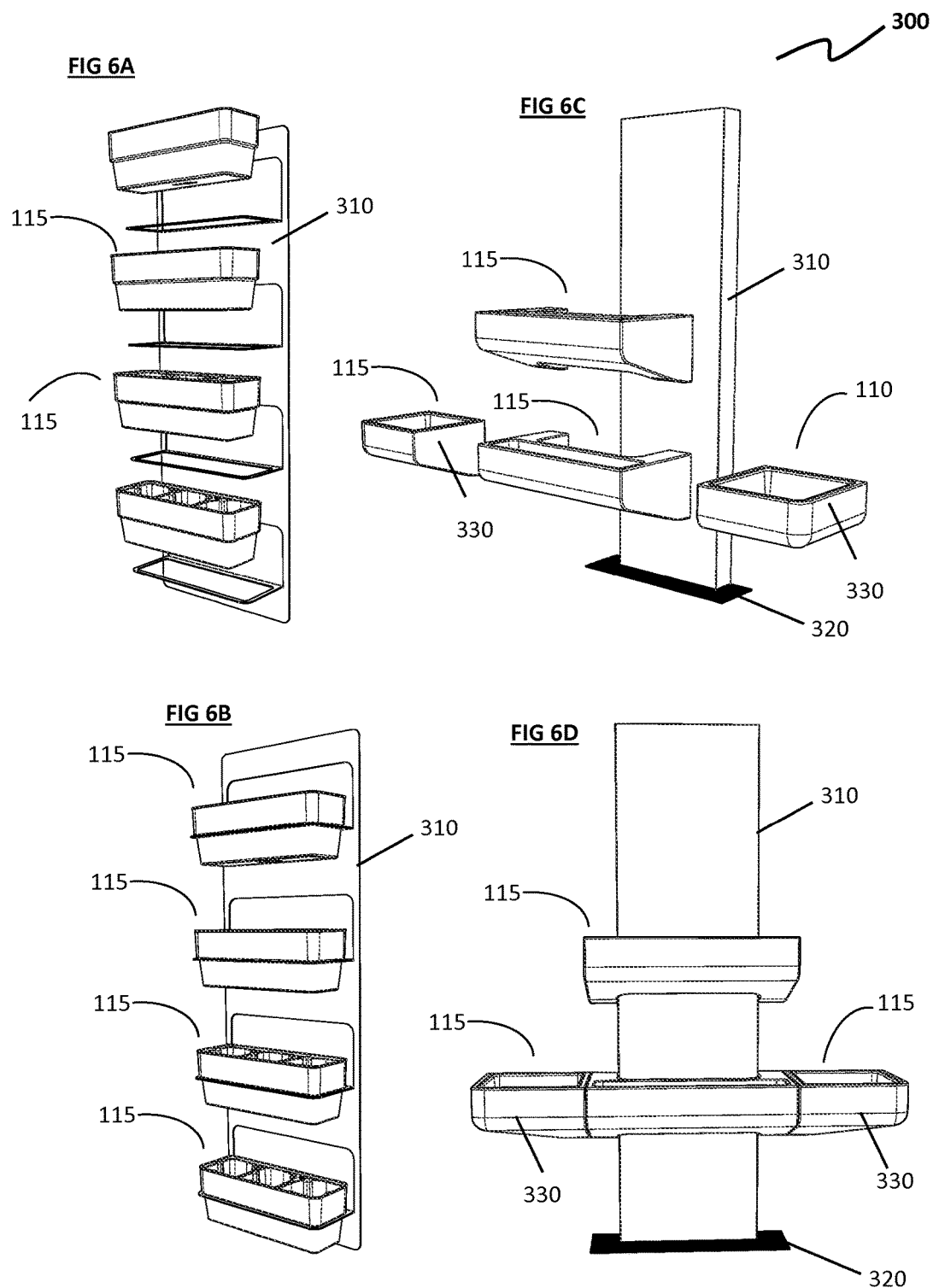

FIG. 6 shows various PODS structures according to exemplary embodiments, each PODS structure comprising modular components of the PODS system arranged to form a vertical garden.

FIG. 6A is an exploded perspective view of a vertical garden.

FIG. 6B is the vertical garden of FIG. 6A in an assembled state.

FIG. 6C is an exploded perspective view of a vertical garden incorporating a water feature.

FIG. 6D is a front view of the vertical garden of FIG. 6C.

Figure 7:
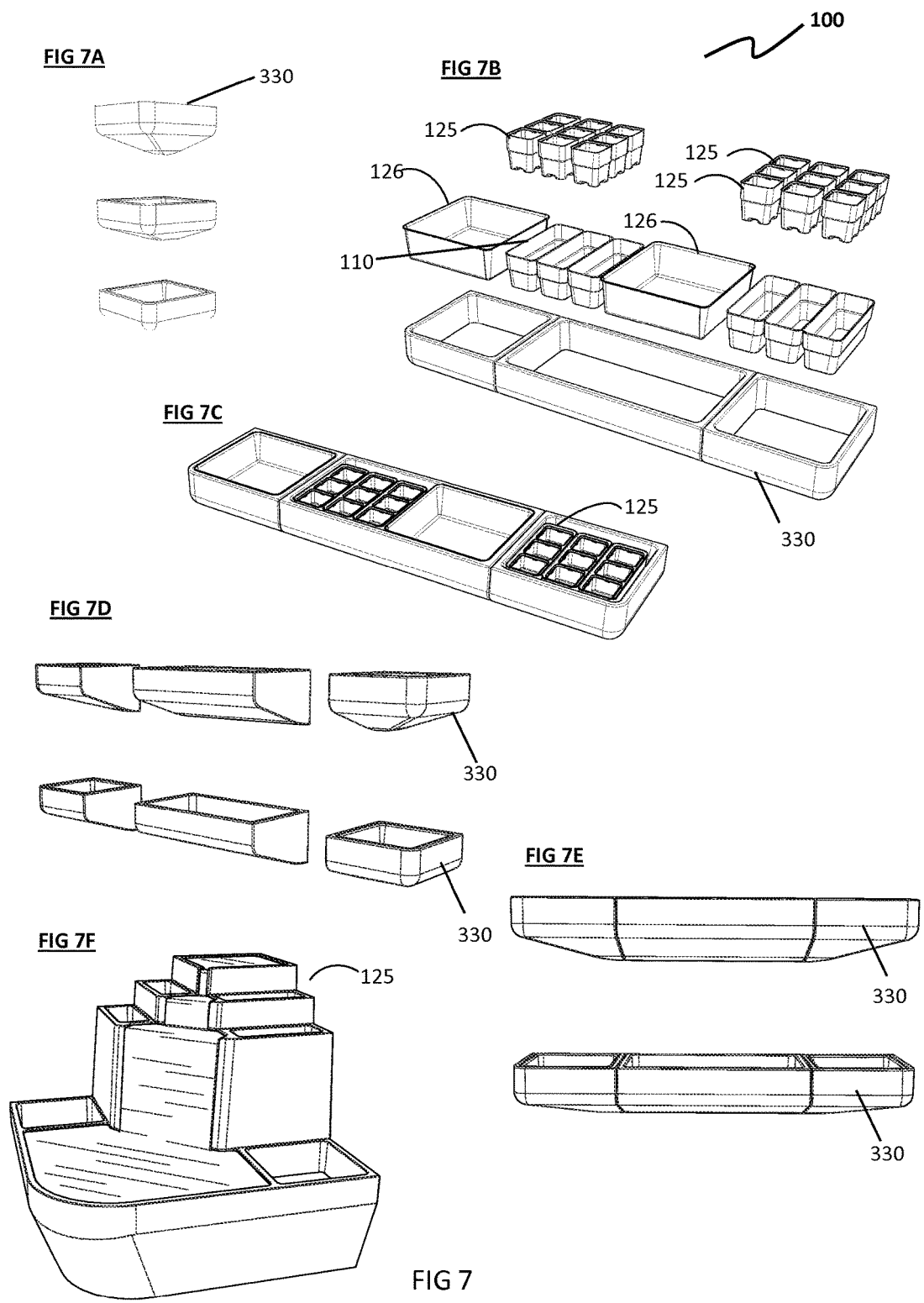

FIG. 7 shows details of components of a PODS system used to create various modular PODS structures according to exemplary embodiments.

FIG. 7A is perspective views of three of the "end pieces" of FIG. 6D, wall mounted as corner units to form a vertical garden.

FIG. 7B shows an exploded perspective view of a plurality of components of the PODS system suitable for forming the structure seen in FIGS. 6C and 6D.

FIG. 7C shows a perspective view of the PODS structure of FIG. 7B in an assembled state.

FIG. 7D shows a perspective view of an alternative PODS structure created using the same components as for the PODS structure of FIG. 7C and two of the corner units of FIG. 7A.

FIG. 7E shows a front view of an alternative PODS structure created using the same components as for the PODS structure of FIG. 7D.

FIG. 7F is a more complex PODS structure combined with a water feature, suitable for installation in interiors, a courtyard or garden.

Figure 8:
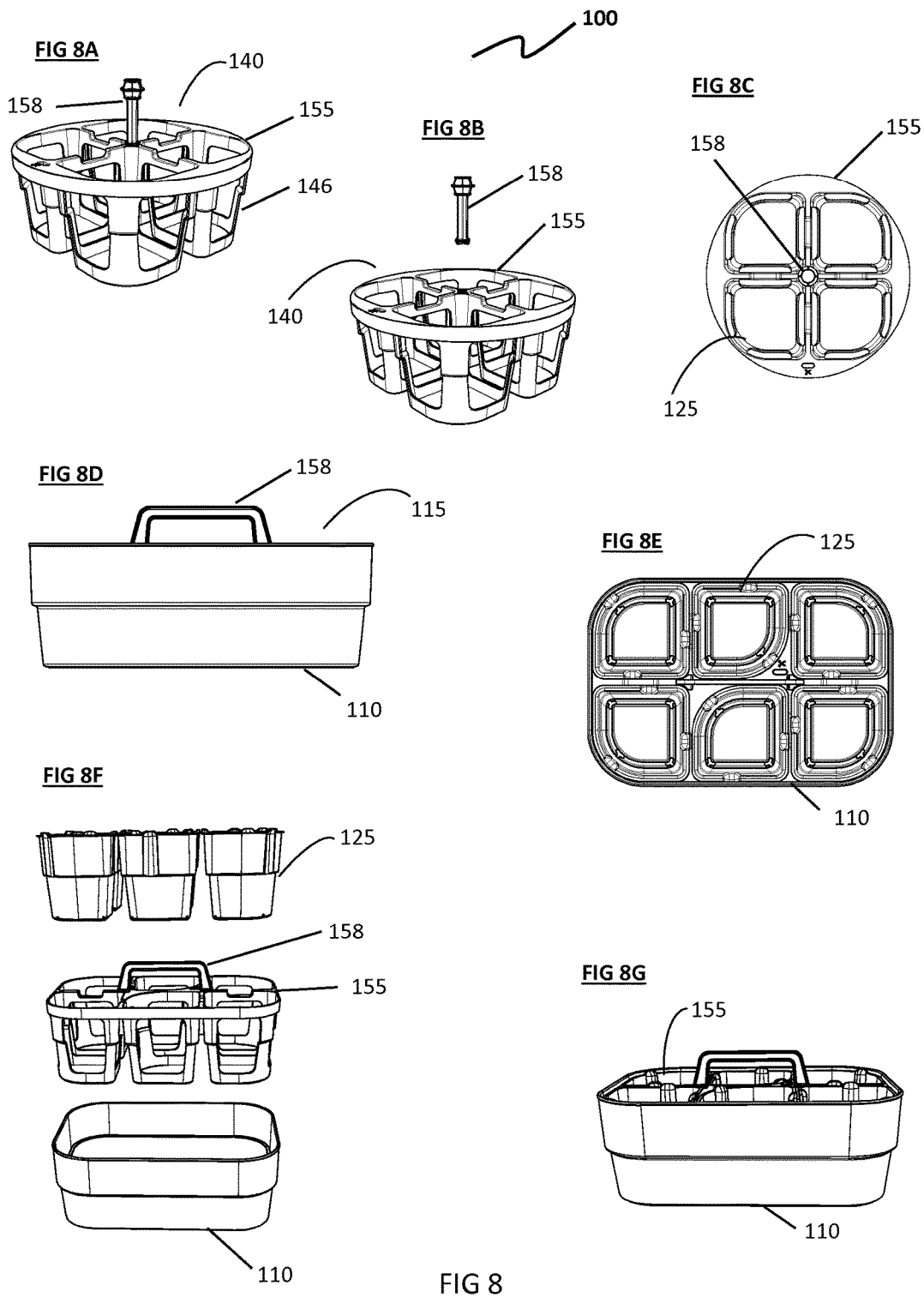

FIG. 8 shows an engagement means for securing one or more inner PODS apparatuses in position in a PODS shell, according to an embodiment.

FIG. 8A is a perspective view of the engagement means of the PODS structures of FIGS. 1D and 2D. The engagement means comprises a tray with deep recesses, and handle means. Each recess is capable of receiving a PODS apparatus (comprising an inner and an outer PODS device).

FIG. 8B is an exploded perspective view of the tray and handle means of FIG. 8A.

FIG. 8C is a plan view of the tray of FIG. 8B showing a hole in the centre. The hole may be used as handle means in its own right. Alternatively, the handle means of FIG. 8A are located at the position depicted by the hole.

FIG. 8D is a front view of the PODS structure of FIG. 1E and showing a profile view of an alternative handle means to that of FIG. 8A.

FIG. 8E is a plan view of the PODS structure of FIG. 8D.

FIG. 8F is an exploded perspective view of the PODS structure of FIGS. 8D and 8E, showing PODS apparatuses, engagement means (in the form of a tray) and a PODS shell.

FIG. 8G is a perspective view of the PODS structure of FIG. 8E in an assembled state.

Figure 9:
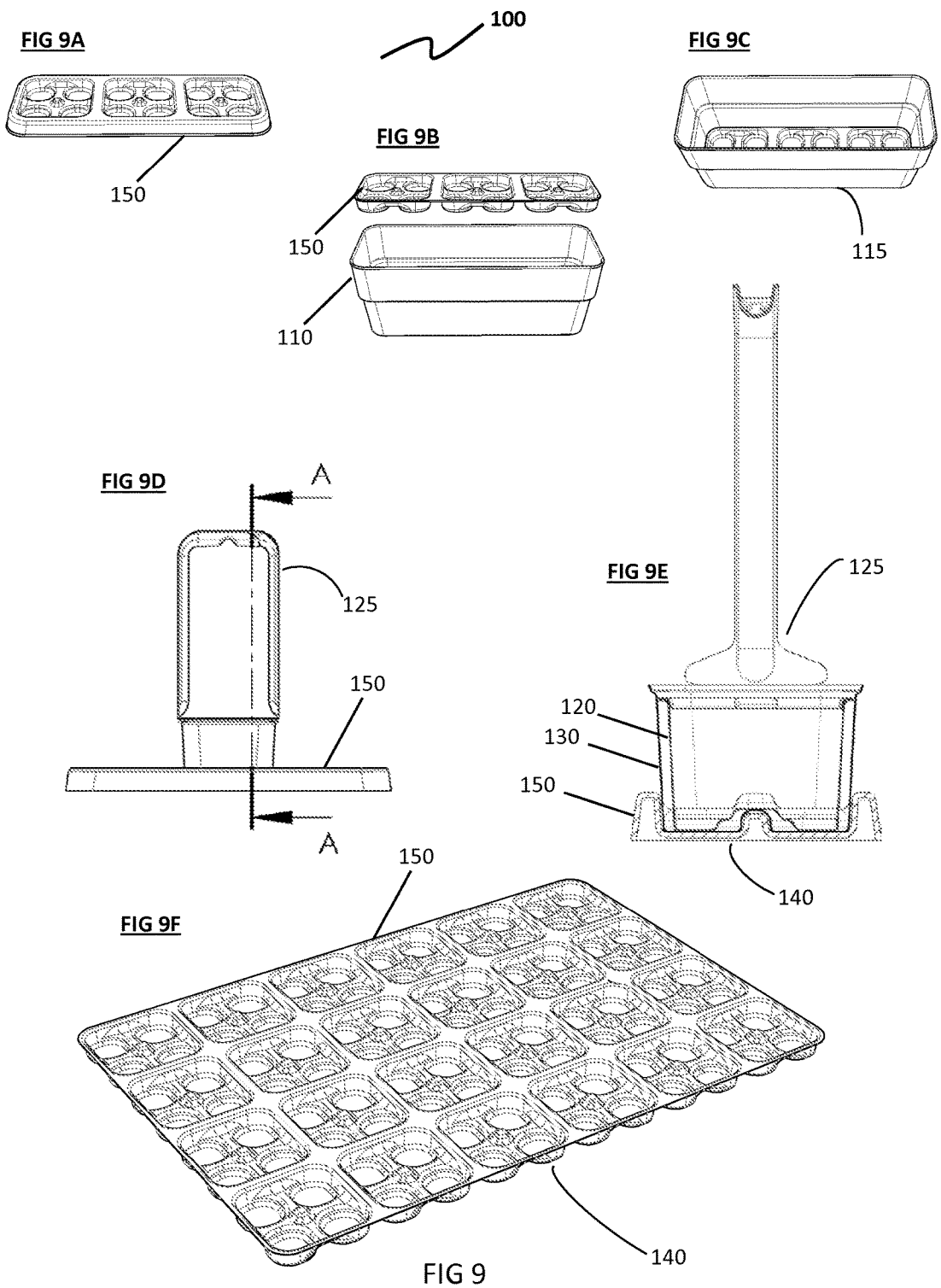

FIG. 9 shows an engagement means for securing one or more PODS apparatuses in position in a PODS shell, according to a preferred embodiment.

FIG. 9A is a perspective view of a tray that forms part of the engagement means. The tray may be freestanding or inserted into a PODS shell.

FIG. 9B is a perspective view the engagement means of the PODS apparatuses of FIGS. 1F, 2A, 2B and 3A. The tray of FIG. 9A provides engagement means and sits along the base of a PODS shell of a corresponding shape.

FIG. 9C shows the tray of FIG. 9A inserted into a PODS shell.

FIG. 9D is a front view of a single-plant PODS apparatus secured in an upright position by the engagement means (tray) of FIGS. 9A and 1F.

FIG. 9E is cross section taken at line A-A of FIG. 9D showing the engagement means, inner PODS device and outer PODS device in profile. The offset profile of the various stepped levels facilitates engagement to secure the PODS apparatus in the PODS shell. FIG. 9F shows a perspective view of an engagement means according to an embodiment. The engagement means (tray) is suitable for securing one or more PODS apparatus in an upright position for transportation, handling and display to, from and within the retail environment.

FIG. 10 shows perspective views of housing for PODS apparatuses according to various exemplary embodiments.

FIG. 10A is an exploded perspective view of a PODS apparatus capable of receiving a single potted plant showing an exemplary housing for protecting the plant crown.

FIG. 10B is the PODS apparatus of FIG. 10A, including the housing, in an assembled state.

FIG. 10C is a perspective view of a PODS apparatus capable of receiving a single potted plant showing an alternative exemplary housing for protecting the plant crown than seen in FIG. 10A. The housing is seen in a closed state.

FIG. 10D is the PODS apparatus of FIG. 10C, in which the housing is shown in an open state.

FIG. 10E is a perspective view of a PODS apparatus capable of receiving a single potted plant showing yet another alternative exemplary housing for protecting the plant crown than seen in FIGS. 10A and 10C. The housing, shown in a closed means includes a handle means.

FIG. 10F is the PODS apparatus of FIG. 10E with the housing shown in an open state.

Figure 11:
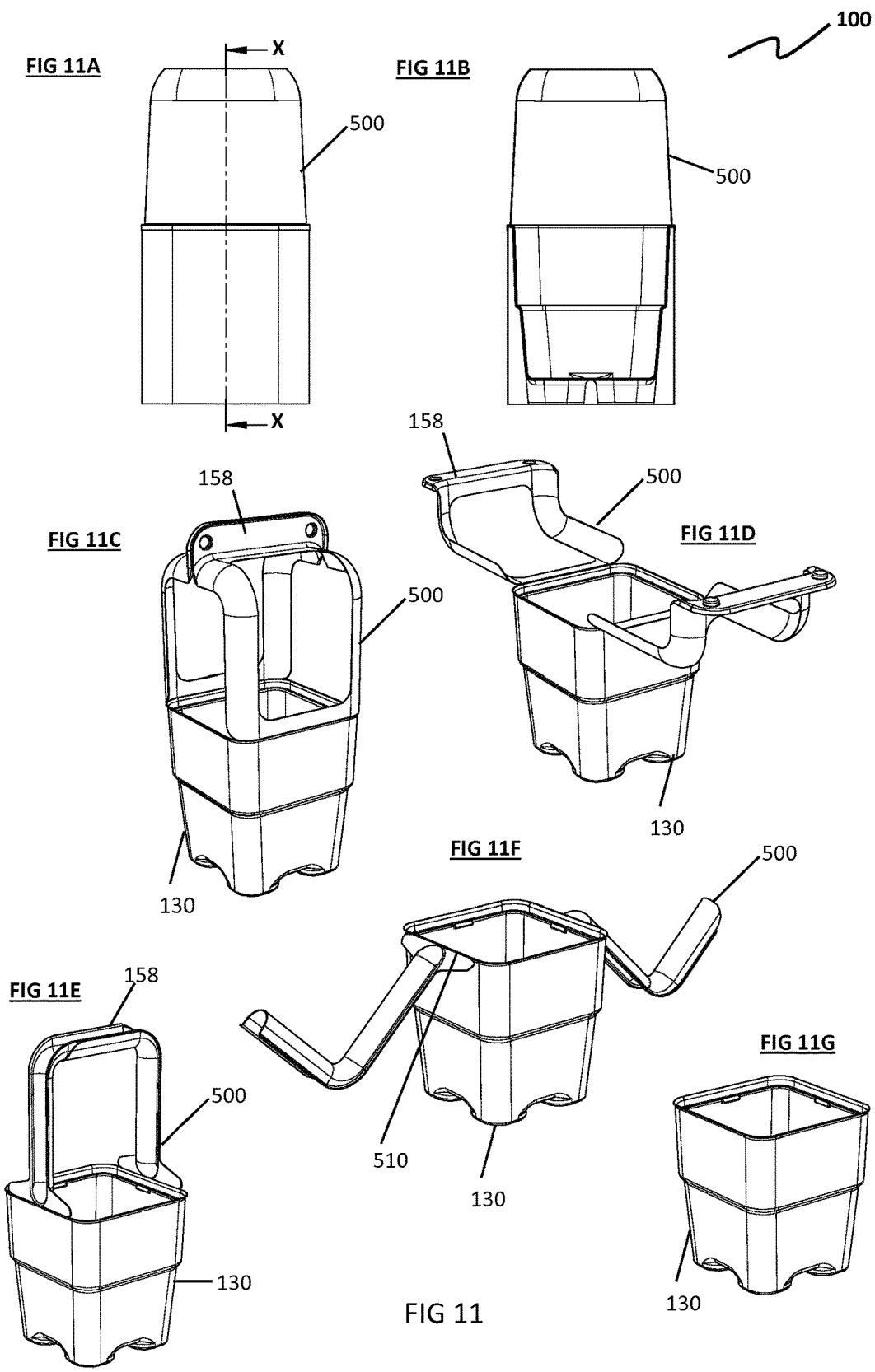

FIG. 11 shows views of a PODS apparatus with various further examples of housing. The housing differs again from the versions shown in FIG. 10.

FIG. 11A is a side view of a housing that encases both the PODS apparatus and the crown of the plant.

FIG. 11B is a cross section of the housing of FIG. 11A shown along line X-X.

FIG. 11C is a perspective view of an alternative housing yet again to those in FIGS. 10 and 11A. The housing functions as a cage around the plant crown. The housing includes handle means, shown in an open state.

FIG. 11D is a perspective view of the housing of FIG. 11C shown in a closed state.

FIG. 11E is a perspective view of a housing according to a preferred embodiment. The housing functions as a roll bar for protecting the plant crown. It also functions as a handle means. The housing is shown in a closed state.

FIG. 11F is a perspective view of the housing of FIG. 11D shown in an open state.

FIG. 11G is a perspective view of the PODS apparatus of FIGS. 11E and 11F, with the housing detached.

Figure 12:
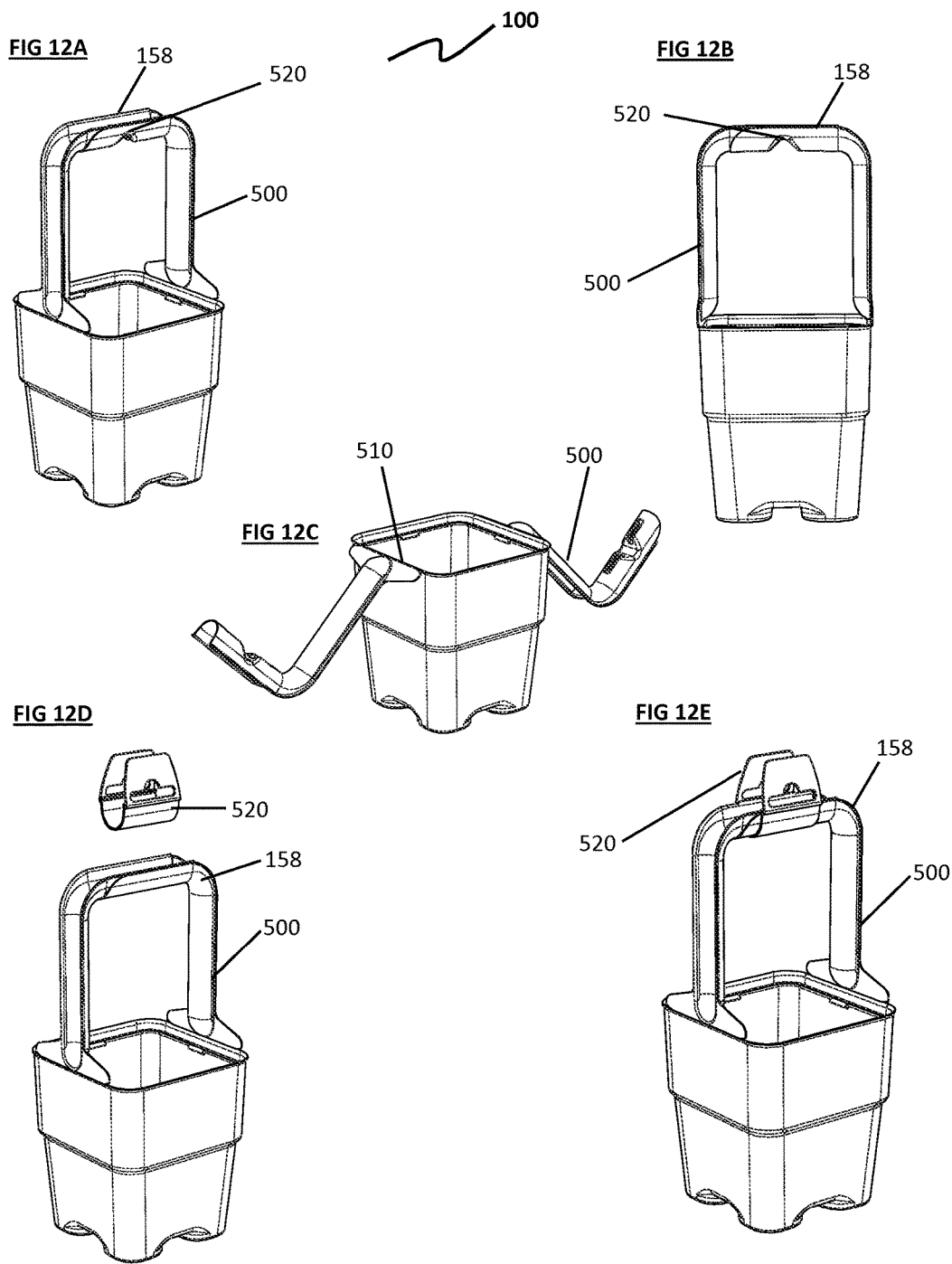

FIG. 12 shows a housing including a hang sell device according to various arrangements.

FIG. 12A is a perspective view of the PODS apparatus and housing of FIG. 11E including a hang sell device. The housing is in a closed state.

FIG. 12B is a front view of the PODS apparatus and housing of FIG. 12A.

FIG. 12C is the housing of FIGS. 12A and 12B with the housing in an open state.

FIG. 12D is an exploded perspective view of the PODS apparatus and housing of FIG. 11E showing an alternative hang sell device than shown in FIGS. 12A to 12C.

FIG. 12E is a perspective view of the hang sell device of FIG. 12D in an assembled state.

Figure 13:
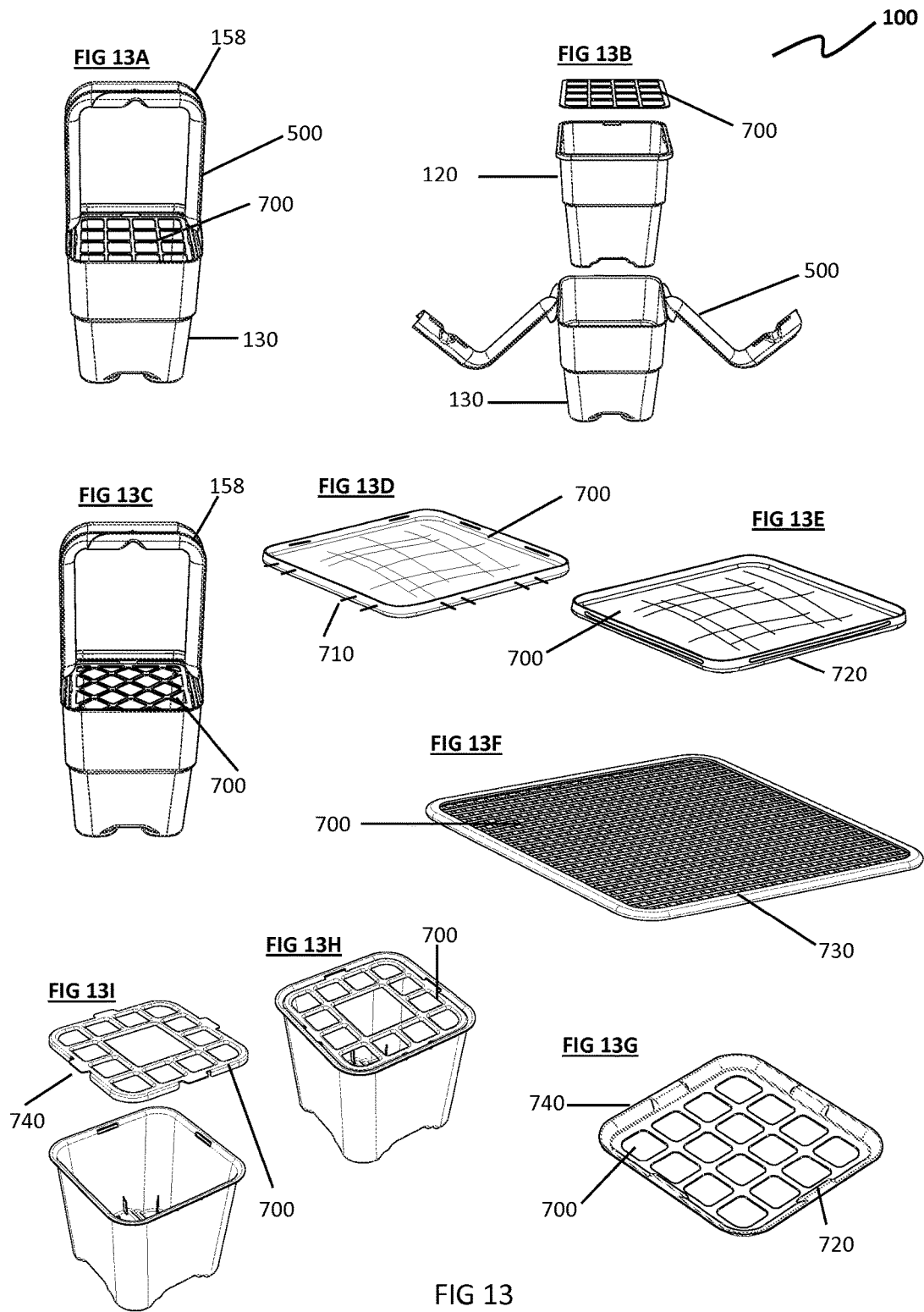

FIG. 13 shows exemplary embodiments of an anti-spill device to minimise mess and spillage from a PODS apparatus.

FIG. 13A is a front view of a PODS apparatus showing an anti-spill device according to an embodiment.

FIG. 13B is an exploded view of the anti-spill device and PODS apparatus of FIG. 13A.

FIG. 13C is a front view of a PODS apparatus showing an anti-spill device according to an alternative embodiment than shown in FIG. 13A.

FIG. 13D is a perspective view of an alternative anti-spill device for a PODS apparatus comprising a thin layer of cloth stapled to the rim of an inner PODS device.

FIG. 13E is a perspective view of yet another alternative anti-spill device for a PODS apparatus comprising a thin layer of cloth with a large weave capable of snap fitting to the rim of an inner PODS device.

FIG. 13F is a perspective view of an alternative anti-spill device for a PODS apparatus than shown above comprising fine mesh and a rubberised rim for engaging to the inner PODS device.

FIG. 13G is a perspective view of an alternative anti-spill device for a PODS apparatus than shown above. The anti-spill device shows raised edges that sit over the rim and clips for locking the device to the rim of an inner PODS device.

FIG. 13H is a perspective view of yet another embodiment of an anti-spill device. The device is grate-like in form but with a central opening to allow for plants to be planted within the inner PODS device as seedlings.

FIG. 13I shows an exploded view of the anti-spill device of FIG. 13H. The anti-spill device depicted has a plurality of lugs that slot into corresponding slots on the upper rim of the inner PODS device.

Figure 14:
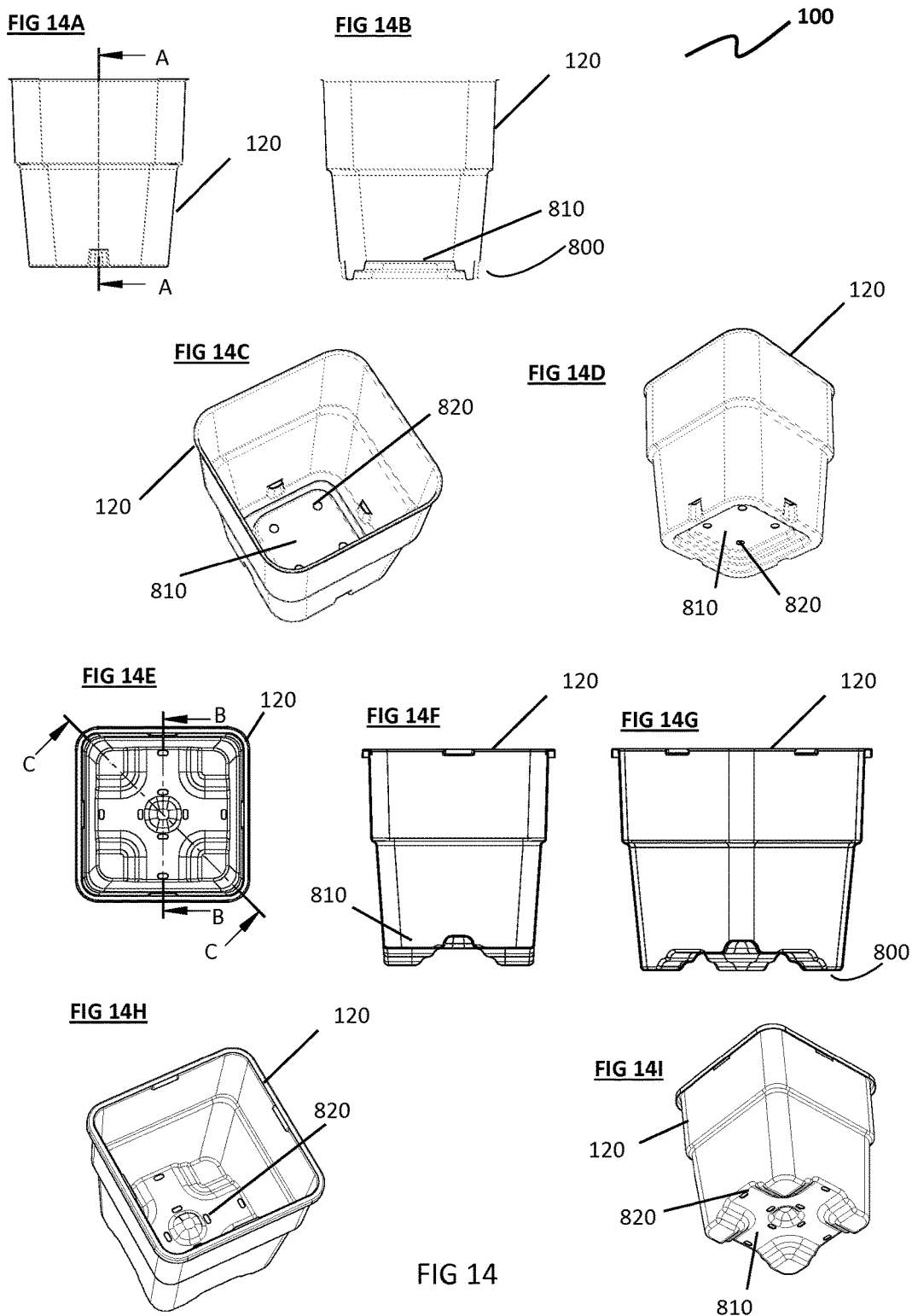

FIG. 14 shows inner PODS devices with various arrangements of a welling device.

FIG. 14A is a front view of an innerPODS device showing a welling device according to an arrangement.

FIG. 14B is a cross section of the inner PODS device of FIG. 14A taken along line A-A.

FIG. 14C is a perspective view of the inner PODS device of FIG. 14A, looking down on the base from above.

FIG. 14D is a perspective view of the inner PODS apparatus of FIG. 14A seen from below.

FIG. 14E is a plan view of an inner PODS device with an alternative welling device than shown in FIG. 14A.

FIG. 14F is a cross section of the inner PODS device of FIG. 14E taken along line B-B.

FIG. 14G is a cross section of the inner PODS device of FIG. 14E taken along line C-C.

FIG. 14H is a perspective view of the inner PODS apparatus of FIG. 14E, looking down on the base of the inner PODS device from above.

FIG. 14I is a perspective view of the inner PODS apparatus of FIG. 14E seen from below.

Figure 15A:
Figure 15B:
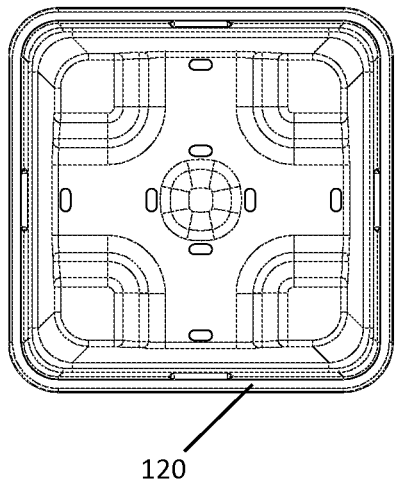
Figure 15C:
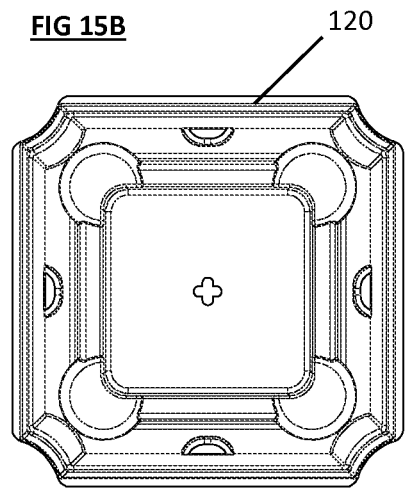
Figure 15D:
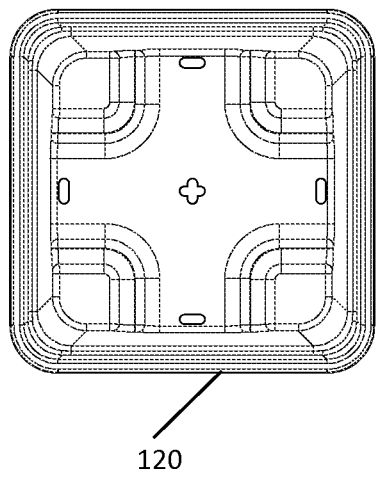
Figure 15:
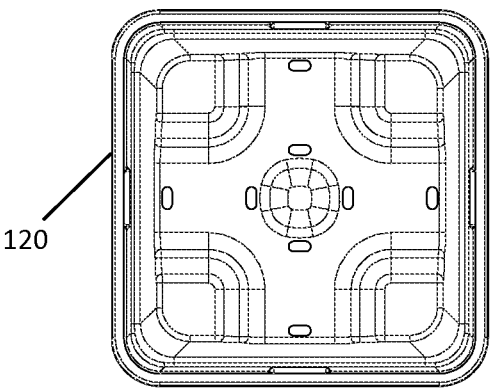

FIG. 15 shows various alternative exemplary arrangements of holes and stepped levels (forming welling devices) in the base of an inner PODS device.

FIG. 15A is a plan view of the base of an inner PODS device showing a welling device divided into quadrants.

FIG. 15B is a plan view of the base of an inner PODS device showing an alternative welling device than shown in FIG. 15A, also divided into quadrants.

FIG. 15C is a plan view of the base of an inner PODS device showing yet another a welling device divided into quadrants.

FIG. 15D is a plan view of the base of an inner PODS device showing an alternative welling device yet again, also divided into quadrants.

Figure 16:
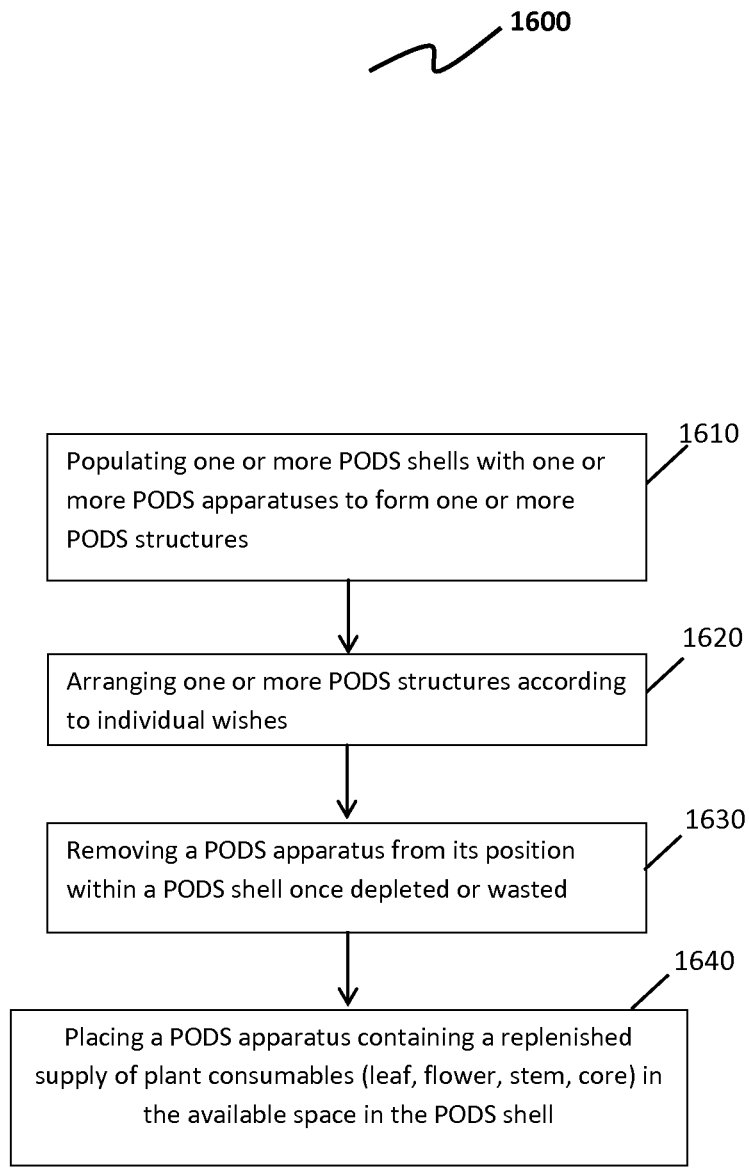

FIG. 16 is a schematic flowchart showing a method of replenishing plants in an exemplary PODS structure.

FIG. 17 shows various accessories that form part of a PODS system.

FIG. 17A shows perspective views of a water jug reversibly attachable to a PODS shell.

FIG. 17B shows a perspective view of a PODS shell including a scissor holder for reversibly holding a pair of scissors on the PODS shell.

FIG. 17C shows perspective views of a PODS shell being held by a balcony frame and a balcony frame for securing a PODS shell to a balcony balustrade without the need for fasteners.

FIG. 17D shows a front view of a hanging frame for securing a PODS shell to an awning, trellis or any other structure suitable for hanging a plant from.

FIG. 17E shows a perspective view of a PODS apparatus showing a hook for securing the PODS apparatus to a shopping trolley or basket.

Figure 1:
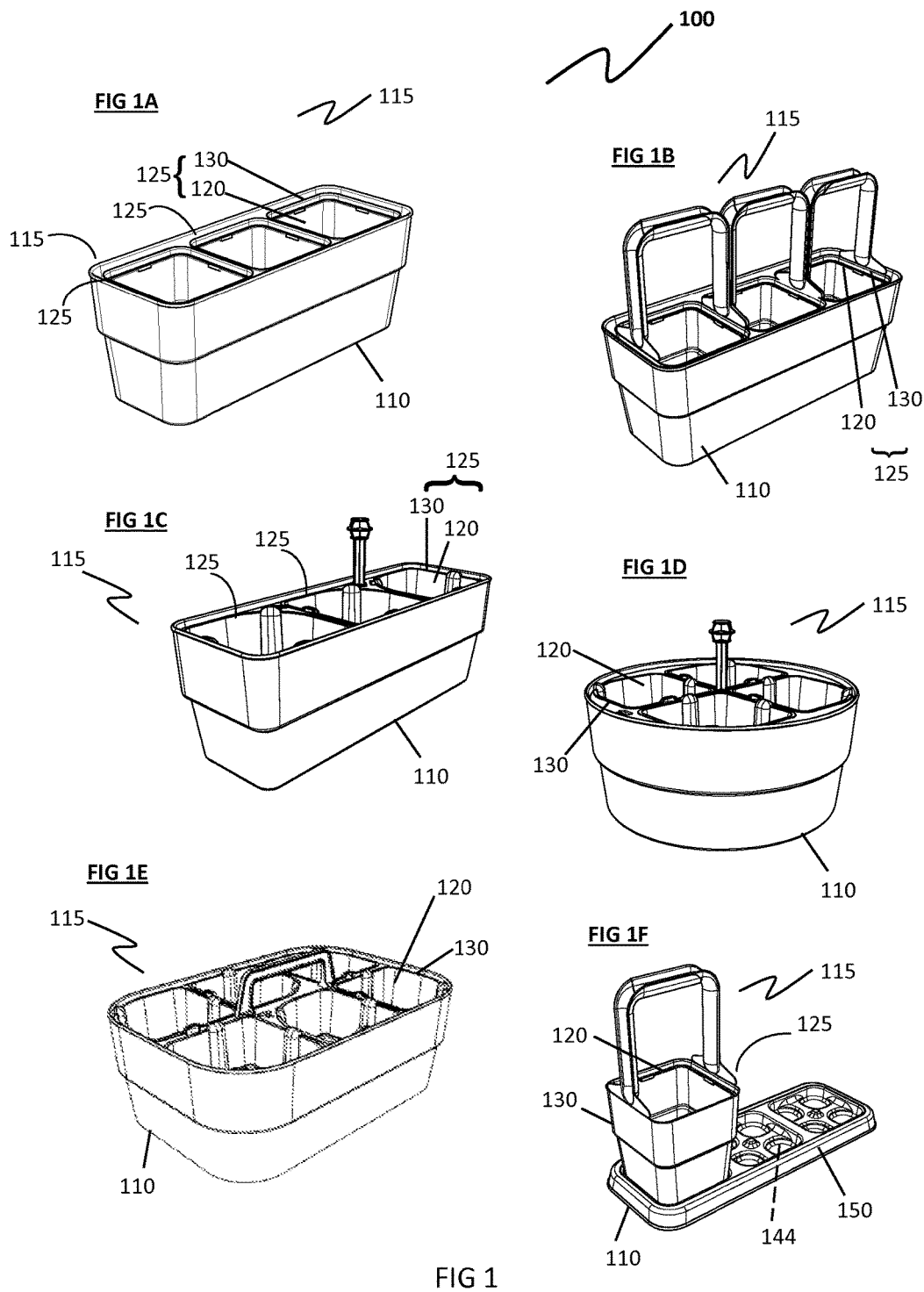
FIG. 1 shows perspective views of plant-on-display-and-storage (PODS) apparatuses and PODS structures according to various embodiments.
Figure 2:
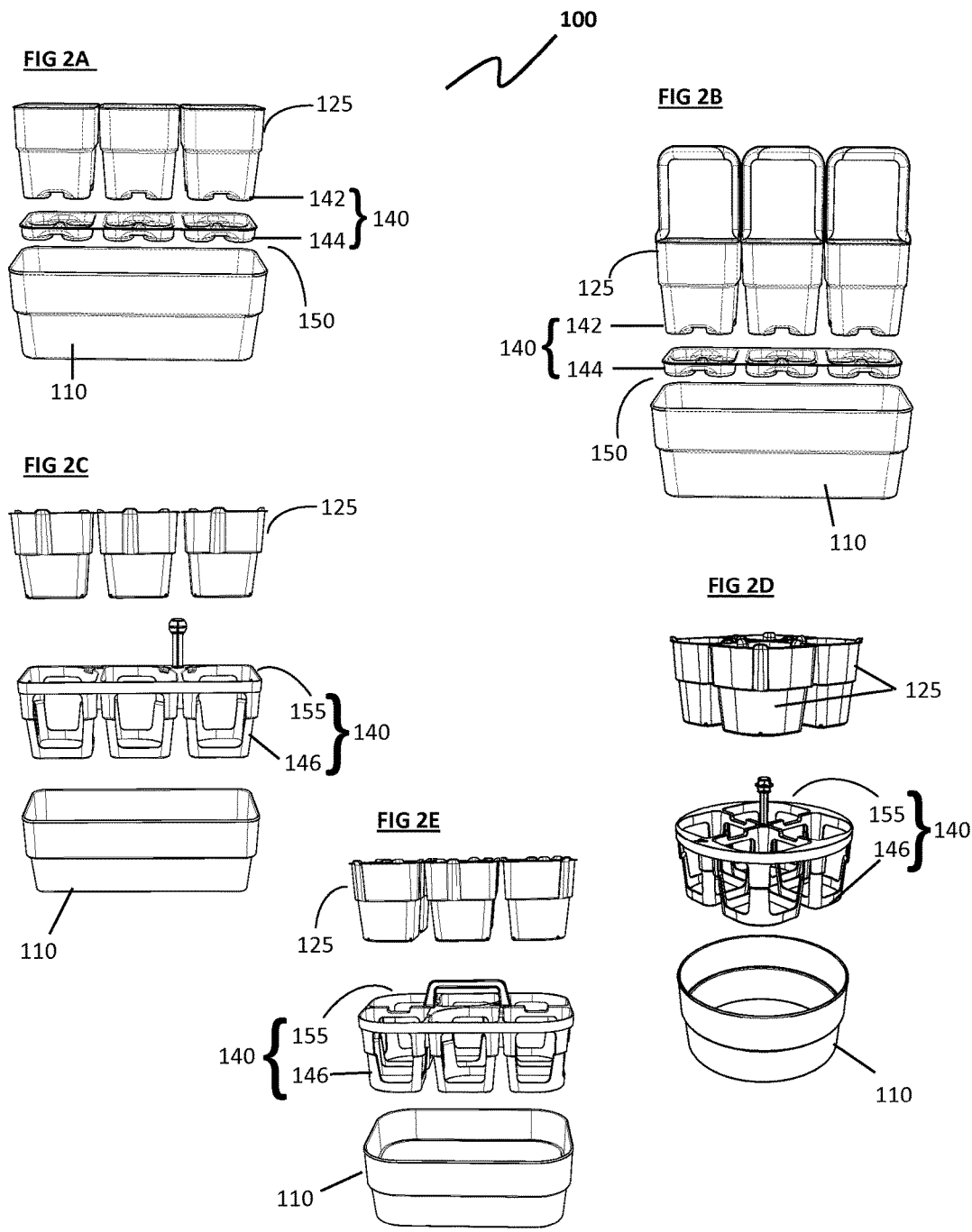
FIG. 2 shows exploded front views of the PODS structures of FIGS. 1A to 1E including various engagement means.
Figure 18:
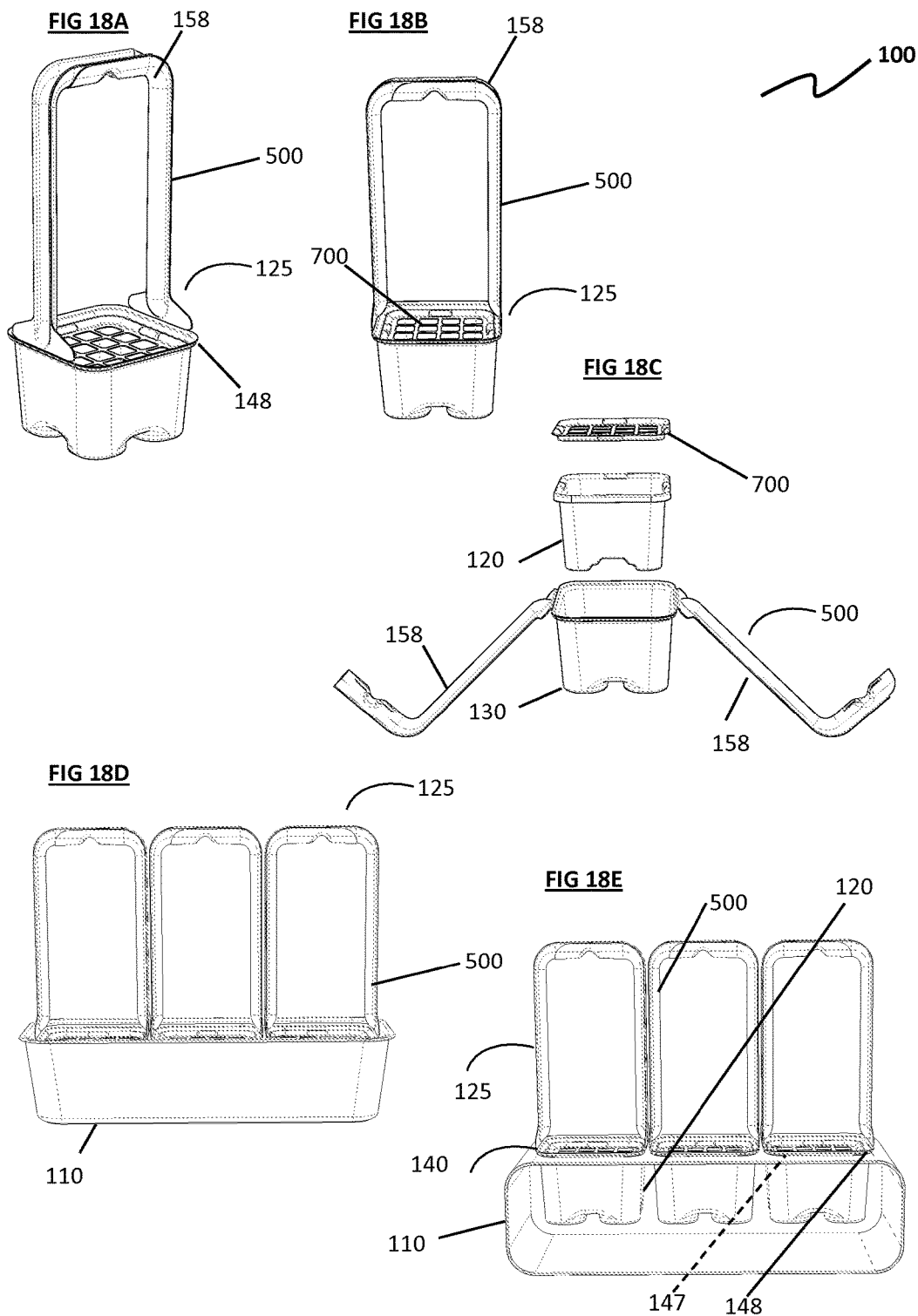

FIG. 18 shows alternative embodiments of a PODS apparatus to the embodiments depicted in FIGS. 1 and 2.

FIG. 18A is a perspective view of an embodiment of an hydroponic PODS apparatus intended for a single plant.

FIG. 18B is a front view of the PODS apparatus of FIG. 18A.

FIG. 18C is an exploded perspective view of the PODS apparatus of FIGS. 18A and 18B.

FIG. 18D is a front view of a PODS shell capable of receiving up to three PODS apparatuses. Apart from the relative height of the PODS apparatus to the housing, the PODS apparatus is otherwise the same as the PODS apparatus of FIGS. 1B and 2B.

FIG. 18E is a front view of an alternative embodiment of a PODS shell to that of FIG. 18D. The PODS shell engages with up to three PODS apparatuses in a different manner than the embodiments of FIGS. 1B, 2B and 18D.

FIG. 19 shows various alternative embodiments of a housing to those depicted in FIGS. 11 and 12. The embodiments are depicted on hydroponic PODS apparatuses but are equally suitable for non-hydroponic versions.

FIG. 19A is a perspective view of a PODS apparatus showing a housing in a closed state. The housing includes a handle means continuous with a sleeve portion.

FIG. 19B is the PODS apparatus of FIG. 19A showing the housing in an open state.

FIG. 19C is a perspective view of an alternative embodiment of a PODS apparatus, showing a housing comprising a handle means with a separate sleeve.

FIG. 19D is a version of the PODS apparatus of FIG. 19C in which the sleeve slides down over the plant and PODS apparatus.

FIG. 19E is a version of the PODS apparatus of FIG. 19C in which the sleeve is slides up over the plant and PODS apparatus.

FIG. 20A shows a side view of the position of the handle means of the outer PODS device of FIG. 18C in which the outer PODS device must be tooled.

FIG. 20B is a front view of an outer PODS device of FIG. 20A once tooled, with the housing in a closed state.

FIG. 20C shows various side profiles of suitable shapes for the handle means of the housing depicted in FIG. 20B.

FIG. 21 shows an alternative embodiment of a hydroponic PODS apparatus than seen in FIG. 18, being a device for transplanting a plant from a hydroponic garden to an external environment.

FIG. 21A shows a perspective exploded view of a hydroponic inner PODS device and an outer PODS device. An anti-spill device can also be seen. The exemplary outer PODS device is shown with a flat base, but could alternatively have a base such as the outer PODS device of FIG. 2A. The outer PODS device has an overhang or flange at its upper rim.

FIG. 21B shows the inner PODS device, anti-spill device and outer PODS device of FIG. 21A assembled to form a PODS apparatus.

FIG. 21C shows a cross sectional view of the PODS apparatus of FIG. 21A in situ in a hydroponic garden (bed).

Figure 22:
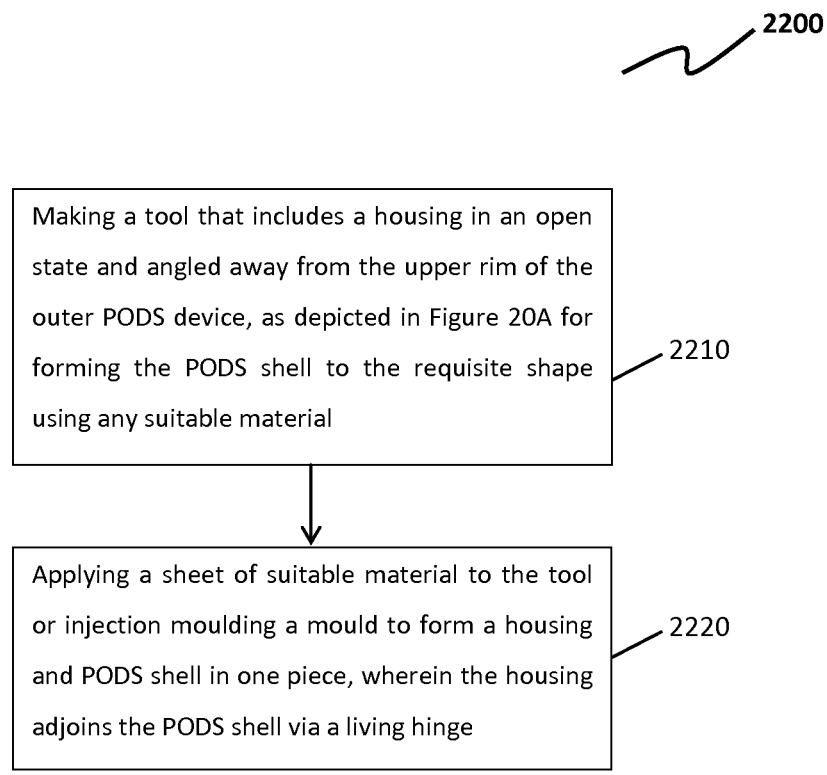

FIG. 22 is a schematic flowchart showing a method of manufacturing the outer PODS device of FIGS. 11F and 18C.

Figure 23:
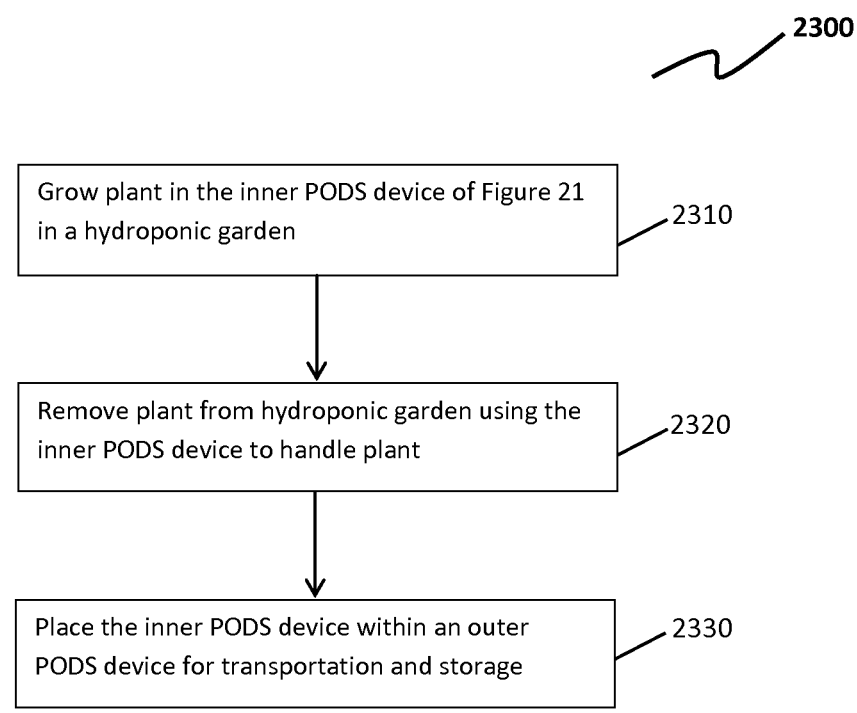

FIG. 23 is a schematic flowchart showing a method of transplanting a plant from a hydroponic garden to an external environment.

FIG. 24 shows various views of an alternative housing than shown in FIGS. 10 and 11. The housing is detachable.

FIG. 24A is a perspective view is shown of the housing firmly fixed to an outer PODS device.

FIG. 24B is a close-up of the engagement of the housing to the outer PODS device, including a catch and a push button release in an engaged state, near the upper rim of the outer PODS device.

FIG. 24C shows the push button release in its engaged state, ready for insertion through a slot in the catch.

FIG. 24D shows the push-button release in a disengaged state after release from the outer PODS device.

FIG. 24E shows the housing is also openable to give ready access to the crown of a plant.

The invention provides a new or alternative modular plant display and storage (hereafter, the "plant-on-display-and-storage" or PODS) system, apparatus and method that allows the orderly arrangement of one or more plants (including, without limitation, edible and ornamental plants). The PODS system, apparatus and method provide an alternative to cut plants by providing a modular storage mechanism that prolongs the life (and maintains nutritional value) of consumable plant parts ("living" versus "cut"). The PODS system meets a need in a market for consumable plants, rather than the market for durable plants, which do not suffer the same disadvantages as plants that need to be replenished on a regular basis.

Referring to FIG. 1, the PODS system 100 includes:
(a) PODS structures (e.g. refer items labelled 115 in FIGS. 1A to 1E) comprising one or more PODS apparatuses (refer item 125 in FIG. 1F), each said PODS apparatus 125 being capable of receiving a plant, each said plant being of one or more of the following types:
  i. an ornamental plant (including a plant with parts sold as consumable products such as flowers, leaves and stems);
  ii. an edible plant (including a plant bearing edible consumable products such as leaves, fruit, flowers, stems, core);
(b) engagement means (e.g. refer items labelled 140 in FIGS. 2A to 2D) for securing each said one or more PODS apparatuses 125 in an upright position within a PODS shell 110.

The PODS apparatus 125 is capable of receiving a plant. This is shown by comparing FIGS. 1F and 4A. Six exemplary arrangements of PODS structure 115 are depicted in FIGS. 1A to 1F. A PODS structure 115 includes a PODS shell 110. The PODS shell 110 may be any suitable shape, each being capable of receiving one or more plants. Various exemplary shapes (e.g. round, square or rectangular) are shown in FIGS. 1A to 1E. In these embodiments, it can be seen from the figures that the PODS shell is deeper than the PODS apparatuses contained therein. In FIG. 1F, the PODS shell 110 is in the form of a tray 150, which also provides engagement means for securing the depicted PODS apparatus 125 in an upright position.

As shown in FIG. 1F, the PODS apparatus 125 is for housing a plant and comprises:
(a) an inner PODS device 120 (which has a base and an internal volume for receiving a plant);
(b) an outer PODS device 130, into which the inner PODS device is inserted. As illustrated in FIG. 1, the outer PODS device is deeper than the inner PODS device and therefore has a larger internal volume than the inner PODS device;
(c) an engagement means for securing the outer PODS device 130 in an upright position. In the example depicted in FIG. 1F, the engagement means is a tray providing a plurality of depressions 150. The depressions are for receiving (and engaging with) projections extending from the bottom of the outer PODS device 130; however, other engagement means are also suitable, as discussed later in this document.

In an embodiment (e.g. FIGS. 1A and 1B, and 2B and 2B), the engagement means tray 150 can be further positioned within a PODS shell 110 to secure the PODS apparatus 125 in an upright position within the PODS shell (e.g. see FIGS. 2A, 2B and 3A).

Referring to FIGS. 1A to 1C, one or more PODS apparatuses 125 (each comprising an inner PODS device 120 and an outer PODS device 130) can be assembled within a single PODs shell 110 to form a PODS structure 115. In an embodiment, the PODS shell 110 (as depicted in FIGS. 1A to 1E) is deeper than any PODS apparatus 125 housed therein. The advantage of this arrangement is that there are two barriers for collecting seepage:

(a) the outer PODS device acts as a first barrier to seepage and collects seepage from the inner PODS device; and
(b) the PODS shell acts as a second barrier to seepage and collects seepage from the PODS apparatus.

This makes the PODS system much more effective in capturing seepage than a simple tray or a saucer sitting under a pot, as there are two barriers to seepage able to cope with even heavy seepage, such as water overflow which often occurs when watering plants. The welling device discussed later in this document prevents water logging of roots, as occurs when potted plants sit permanently in a saucer filled with water or in an outer decorative pot.

This is depicted by way of example in FIGS. 1A to 1E, in which a single PODS shell 110 is capable of housing or accommodating up to three to six PODS apparatuses 125, respectively. In FIG. 1B, the PODS apparatuses 125 housed within the PODS shell 110 are the same as item 125 depicted in FIG. 1F. Each PODS apparatus 125 houses a single plant. In this way, a PODS shell 110 may house an individually curated selection of plants. Unlike planter boxes or beds, however, each plant is separately contained in its own PODS apparatus 125. The advantages include:
(a) a simplified process for the addition, removal and replacement of plants;
(b) reduced mess involved with removing and adding a plant; and
(c) removing and adding a plant does not disturb the roots of adjacent plants.

PODS shell shapes other than those illustrated in FIGS. 1 and 2 are also suitable. These other shapes would allow different configurations of PODS apparatuses to be housed by the PODS shell. FIGS. 4B to 4E show exemplary PODS structures 115, each PODS structure comprising:
(a) one or more PODS apparatuses 125, each containing an inner PODS device 120 and an outer PODS device 130 for housing a plant; and
(b) a PODS shell 110 of varying sizes and shapes, housing a number of PODS apparatuses 125 (and plants).

FIG. 4 shows various exemplary custom arrangements of a plurality of consumable (ornamental and/or edible) plants that can be achieved with PODS structures 115 that form part of the PODS system 100. The PODS structure 115 offers the ornamental and display advantages of cut plants or floral arrangements (allowing flexibility of arrangement, including of plants that are not suitable for display as cut plants—e.g. those with insufficient plant structure to be stood in water), yet overcomes the quality and safety disadvantages associated with harvesting of plants. One or more plants in the custom arrangement can be individually replaced as desired. This is effected by replacing the PODS apparatus that houses a specific plant. This reduces the mess associated with removing a plant and planting a new plant in its place.

The PODS system 100 (refer FIGS. 1 to 24) has the additional advantage of providing a customisable storage solution that allows for storage of consumable plants according to individual consumption patterns. This is achieved by the modular nature of the PODS system 100, which provides flexibility to store a plurality of consumable plants in an orderly arrangement even in limited space.

The PODS system 100 allows individual plants to be stored in varying quantities, thereby giving greater storage capacity to plants that are consumed (used up) more quickly than others. In other words, a custom arrangement of plants can be stored or displayed according to individual wishes or consumption patterns. The PODS system 100 also allows these plants to be replenished by simply removing a depleted plant and replacing it with new one. This is effected by removing and replacing the entire PODS apparatus containing the appropriate plant. This avoids the disadvantage of planter boxes or plant beds, which involve the need to dig up the soil (or other growing medium) and risk damaging or disturbing other plants. The orderly arrangement of PODS apparatuses within PODS shells also allows individual plants to be located and accessed easily, and for the available stock of any individual plant to be assessed at a glance and replenished in a simple operation.

FIG. 5 is a schematic flowchart showing a method 500 of positioning a plurality of PODS apparatuses 125 (in this example, six) in a PODS shell 110.

In an embodiment, one or more consumable plants are selected (e.g. according to user consumption patterns, needs or aesthetic wishes)—step 510. Each selected plant is in a PODS apparatus 125. The PODS apparatuses 125 are secured in an upright position in a PODS shell 110 by engagement means 140 (depicted in this example as a tray 155 with deep recesses, each recess capable of receiving a PODS apparatus 125)—step 530. Step 520 is an optional step of aligning the engagement means 155 in position in a PODS shell 110. This step is performed if the engagement means 155 (tray) is separate from the PODS shell. The same method(s) can be employed with the engagement means 150 (tray) of FIGS. 1F, 2A and 2B.

The PODS system 100 also addresses the problem that many consumable plants are not re-potted (because of the need to replace them quickly), resulting in an unsightly display of individual disposable pots. This is achieved by the PODS system and apparatus providing an ornamental display and storage housing for consumable plants (i.e. plants that need to be replenished frequently). The PODS system and apparatuses reduce mess and spillage, as well as providing an orderly arrangement of one or more consumable plants. This is particularly advantageous when dealing with plants indoors and/or where space is limited.

Referring to FIG. 8, engagement means 140 are provided for securing one or more PODS apparatuses 125 in an upright position. In an embodiment, the engagement means 140 secure PODS apparatuses upright within a PODS shell 110.

This may be achieved through any suitable engagement of the PODS apparatus (whether inner PODS device, outer PODS device or other part of the PODS apparatus) to a PODS shell. This is shown by way of example only in FIGS. 1F, 2A, 2B, 3A to 3E, in which the engagement means include one or more projections extending from a first component of the PODS system for engagement with one or more depressions correspondingly positioned and formed within a second component of the PODS system. The first component and second component respectively includes any one of the following:

(a) a PODS apparatus or a component thereof;
(b) a PODS shell.

The engagement means engages the first component with respect to the second component at one or more of the following:

(a) their respective bases (e.g. the base of an outer PODS device or of the PODS apparatus engages the base of a PODS shell from within the PODS shell);
(b) their respective upper portions (e.g. the upper rim of a PODS apparatus engages the upper rim of a PODS shell).

In a preferred embodiment, the engagement means 140 engage a PODS apparatus in an upright position through engagement of projections on the base of the outer PODS device 130 to a tray that sits within the base of a PODS shell 110 (e.g. refer FIGS. 2A, 2B and 8F).

In the embodiments depicted in FIGS. 2A, 2B, 3A and 9, the base of the outer PODS device 130 (or, as depicted, the base of a PODS apparatus 125, which in turn comprises an outer PODS device 130 housing an inner PODS device 120) is secured to the PODS shell 110 by positioning the outer PODS device 130 (or PODS apparatus 125) on a removable tray 150 and positioning the tray 150 along the base of a PODS shell 110 with a corresponding shape. In the embodiment depicted in FIG. 1F, the base of the outer PODS device 130 is secured to a removable tray 150 but the tray 150 is not positioned in a PODS shell (i.e. remains free-standing). Alternatively, as depicted in FIG. 3D, a PODS outer device 130 may engage with a PODS shell 110 at the respective upper portions or rims.

In the embodiment depicted in FIG. 3B and 3C, the engagement means comprises projections at the base of the PODS shell which extend up into the internal volume of the PODS shell to engage with depressions at the base of an outer PODS device such as the outer PODS device shown in FIG. 4A. The engagement is a cupping or profiling of the depressions formed in the base of the outer PODS device (depressions into the internal volume of the outer PODS device) by the projections formed in the base of the PODS shell (these projections project into the internal volume of the PODS shell). The corresponding profiles hold the outer PODS device upright and in position in the PODS shell. Any suitable shape of corresponding projections and depressions would work.

The engagement means 140 (e.g. see FIG. 2) are discussed in further detail later in this document.

In an embodiment, the PODS system 100 further includes:

(a) a choice of mounting devices that allow a POD apparatus to be mounted on a vertical or horizontal surface—e.g. wall mounted (individually or in groups), or hung from a balcony rail or awning (see also FIGS. 17C and 17D);

(b) a choice of joiner devices that allow PODS structures to be joined in modular fashion so to create various forms (hereafter, PODS superstructures, e.g. vertical gardens);

(c) a choice of filler pieces to fill out or assist define the form of any individual PODS superstructure;

(d) a choice of finishes or materials for the exterior surface of PODS shells, structures and superstructures (as well as filler pieces). For example, the PODS shells depicted in FIGS. 1A to 1F may be made of plastic or melamine in a flat colour, or a brushed metallic finish.

In yet another embodiment, the PODS system includes one or more accessories (refer FIG. 17), including:

(a) a water jug 1700 that is clippable to any component of the PODS system, e.g. clippable on to the PODS shell (FIG. 17A);

(b) a tool holder, e.g. a scissor holder 1710 on the engagement means 155 (refer FIG. 17B) so that a pair of scissors 1720 (or other gardening tool) can be positioned on the PODS apparatus for convenience and storage;

(c) hooked scissors for hooking or otherwise mounting onto the PODS apparatus (without the need for a scissor holder);

(d) mounting devices such as:
  i. a balcony frame 1730 (FIG. 17C) for securing a PODS structure to a balcony balustrade without the need for fasteners. This is particularly useful for high density living;
  ii. a hanging frame 1740 (FIG. 17D) for securing a PODS structure to an awning, trellis or any other structure suitable for hanging a plant from;
  iii. a hook (refer item 1750 in FIG. 17E) for securing a PODS apparatus (or a component of the PODS apparatus—such as an outer PODS device) to a shopping trolley or basket.

FIG. 6 shows various modular PODS superstructures 300 created using PODS structures 115 (each PODS structure comprising one or more PODS apparatuses, each PODS apparatus in turn comprising an inner PODS device housed in an outer PODS device) and a joiner device 310. In FIGS. 6A and 6B, the modular PODS superstructure 300 forms a wall garden or vertical garden. The modular PODS superstructure 300 includes a plurality of rectangular PODS structures 115 (each housing a plurality of consumable plants) mounted on the joiner device 310. The joiner device 310 depicted in FIGS. 6A and 6B stands against the wall and is secured with a mounting device to prevent movement.

In FIGS. 6C and 6D, another exemplary modular PODS superstructure 300 is illustrated. This structure forms an alternative version of a vertical garden. A joiner device 310 holds various PODS structures 115 in vertical arrangement in similar fashion to FIG. 6A. This time, however, the joiner device 310 includes a water feature that flows to a water drain 320 that sits at floor level.

Modular PODS superstructures 300 may also include lighting components.

FIGS. 6C and 6D show perspective and front views, respectively, of a plurality of PODS structures 115 joined horizontally and then combined on a joiner device 310 to form a vertical garden (one example of a modular PODS superstructure 300). This is suitable for interior or exterior use.

Illustrated in each of FIGS. 7B and 7C is a plurality of components of the PODS system 100 suitable for forming the modular PODS superstructure 300 of FIGS. 6C and 6D. The end pieces 330 of the modular PODS superstructure 300 of FIGS. 6C and 6D can be wall mounted as individual corner units 330. FIG. 7A shows three corner units 330 (each made from the end piece 330 of FIGS. 6C and 6D) wall mounted to form an alternative form of vertical garden. FIG. 7B shows a plurality of PODS apparatuses 125 for holding single plants as described earlier in this document. Larger versions of the PODS apparatus 126 are also shown. These include the same features as smaller PODS apparatuses 125 but are intended to house larger plants e.g. a succulent such as agave.

FIGS. 7D and 7E show perspective and front views, respectively, of yet other forms of modular PODS superstructures, also vertical gardens, made by combining various PODS structures 115 and components, then wall mounting in two tiers the resultant PODS structure(s). FIG. 7F is a more complex modular PODS superstructure 300 combined with a water feature, and suitable for installation in an interior, a courtyard or garden.

The PODS structure may be thus be made from a single PODS apparatus or an arrangement of two or more PODS apparatuses within a PODS shell. PODS structures can be combined to form modular PODS superstructures, which can be further modified or built on in modular fashion, providing flexibility in use (ornamental and/or functional garden) and flexibility in positioning.

The inner PODS device 120 sits within an outer PODS device 130 (e.g. as depicted in FIGS. 13B and 18C) to:
  (a) reduce the risk of spillage and mess caused by water and/or soil (mud) or other growing medium seeping through holes at the base of each inner PODS device 120;
  (b) improve water access to plant roots, because the inner PODS devices 120 include a welling device that regulates water volume (discussed in further detail below and shown in FIGS. 14 and 15). The outer PODS device 130 captures water overflow and acts as a secondary source of water available to plant roots. This is described in further detail below.

The inner PODS devices can be made of any suitable material, including organic and sustainable material such as bamboo, biodegradable plastic (any suitable plastic), recyclable plastic, lined cardboard, moulded cardboard or moulded pulp preferable recyclable for sustainability. The outer PODS devices and PODS shells can similarly be made of any suitable material or finish, including (without limitation) organic and sustainable materials, melamine, biodegradable plastic (recyclable and unrecyclable), metal (e.g. aluminium or titanium), silicone or thermoplastic rubber or polyurethane.

An engagement means (depicted as item 140 in FIGS. 2A to 2E) secures the outer PODS device 130 into position within the PODS shell 110. The engagement means 140 prevents the outer PODS device 130 (housing an inner PODS device 120) from tipping over within the PODS shell 110—even if the PODS shell 110 is not filled to capacity. It also prevents individual PODS apparatuses from sliding out of place—i.e. it secures each PODS apparatus in position.

In an embodiment, the engagement means 140 includes an engagement mechanism such as:
  (a) one or more studs or projections 142 at the base of the outer PODS device 130, and corresponding recesses 144 within a tray 150 to receive the outer PODS device projections 142. In a preferred embodiment, the corresponding recesses 144 are as depicted in FIGS. 2A, 2B and 9A to 9C. The recesses are formed in a removable tray 150. The tray 150 is of a dimension that is capable of substantially filling the base of a PODS shell 110. The size of the tray 150 secures the tray 150 in position along the base of the PODS shell 110—see FIGS. 3A, 9B and 9C. Alternatively, the recesses are formed along the base of the PODS shell 110 itself rather than in an insertable tray. In every case, each PODS apparatus is held upright within the PODS shell—even if the PODS shell is not filled to capacity;
  (b) one or more studs or projections at the base of an outer PODS device 130 for insertion into corresponding recesses 144 in a freestanding tray 150 (FIG. 1F) so that the PODS apparatus 125 is held in an upright position on the tray (see FIG. 1F). In this embodiment, there is no PODS shell separate from the tray. The freestanding tray 150 may be the same as the insertable tray 150 of the embodiment in FIGS. 2A, 2B and 3A; or
  (c) one or more projection(s) 142 at or near the upper perimeter of the PODS outer device(s) 130 to fit with corresponding recesses 144 at or near the upper perimeter of the PODS shell 110 (see FIGS. 3D and 3E).

The projections fit into the corresponding recesses to secure the outer PODS device in an upright position. Each inner PODS device is capable of receiving a potted plant. In this way, the consumable plant is held in an upright position.

The recesses may be formed within a tray 150 (FIG. 1F) that sits at the base of PODS shell 110 (FIG. 3A). Alternatively, the recesses are formed in the base of the PODS shell 110 itself or the tray 150 is the PODS shell (FIG. 1F) and there is no separate PODS shell. In these latter embodiments, the PODS structure does not include a PODS shell but comprises a PODS inner device (for receiving a potted plant) in a PODS outer device that can be secured in an upright position (e.g. by being positioned securely on engagement means) during transportation or handling. FIG. 9D is a front view of a single-plant PODS apparatus secured in an upright position by the engagement means of the tray of FIGS. 1F and 9A.

FIG. 9E is a cross section taken along line A-A of FIG. 9D showing engagement means 140 (in the form of a tray 150) and a PODS apparatus 125. The respective profiles of the tray recesses and the projections of the inner and outer PODS devices are offset but otherwise identical. The projections (and hence recesses) include a number of "steps". The offset profiles of the various stepped levels of corresponding recesses and projections further facilitate engagement of the PODS apparatus 125 on the tray 150. In this way, the engagement means (corresponding projections and recesses) secure the inner PODS device(s) in an upright position.

FIG. 9F shows an embodiment of the engagement means 140 (in the form of a tray 150) suitable for transportation, handling and display of one or more PODS apparatuses. The tray 150 fits into conventional retail trays and enables the transportation, handling and display of PODS apparatuses to, from and within the retail environment without risk of tipping that can result in spillage and mess, as well as damage to plants.

Other embodiments of the engagement means may also be used to hold a plant in an upright position within a PODS structure. This includes engagement means elsewhere on the PODS apparatus (whether inner PODS device, outer PODS device or other part of the PODS apparatus) to secure the PODS apparatus upright within a PODS shell.

If there is no additional PODS shell (i.e. separate from the tray), the side walls of the tray 150 are of a sufficient height to catch some liquid overflow from the PODS apparatus. For example, referring to FIG. 1F, a tray 150 for a window sill PODS shell that is capable of receiving up to three PODS apparatuses may have a depth of 10 mm; however, the depth is relative to the number of the PODS apparatuses and will be greater for a greater number of PODS apparatuses intended to be secured on the tray 150. In this way, the tray 150 serves a function beyond performing as an engagement means.

The tray 150 (or PODS shell) also acts as a secondary source or welling device to capture excess liquid that escapes from the PODS apparatus. It also assists to minimise mess from seepage of growing medium (and/or liquid) by collecting seepage and in so doing acting as a barrier to seepage escaping out from the PODS apparatus (indeed, a second barrier in the PODS system—the first barrier being the outer PODS device that collects seepage from the inner PODS device).

In an alternative arrangement, the engagement means 140 is a tray 155 with deep recesses 146 (see FIGS. 2C to 2E), each recess of sufficient size and shape to fit the entire base of a PODS apparatus (these recesses are depicted in plan view in FIG. 8C to 8E, in which the recesses are intended to take a PODS apparatus 125 of a rounded pie-slice shape by way of example only. PODs apparatuses 125 may be of any suitable shape e.g. square, circular, rectangular). The recesses are sufficiently deep to hold each PODS apparatus in an upright position even if the PODS shell 110 is not filled to capacity. Examples of this arrangement of engagement means are depicted in FIGS. 2C to 2E and 8F.

FIGS. 8A and 8B are perspective views of the engagement means 140 of the PODS apparatus of FIGS. 1D and 2D. In FIG. 8A the engagement means is in an assembled state. FIG. 8B is an exploded view showing the components of the engagement means: a tray 155 and handle means 158. The tray 155 has deep recesses 146 for receiving PODS apparatuses (each comprising an inner and an outer PODS device), as described above.

In an embodiment the handle means 158 is one or more holes in the tray 155 of sufficient size to accommodate a finger. For example, FIG. 8C is a plan view of the tray 155 and shows a hole in the centre of the tray that can be used to handle the tray 155 even when filled to capacity. In this way, the hole may be used as handle means. Alternatively, separate handle means such as the handle means 158 of FIG. 8A are secured to the tray 155 at the position depicted by the hole. Alternatively again, the handle means 158 can be as depicted in FIG. 8D, which shows a handle means in profile.

In any embodiment, the handle means 158 facilitates handling of the tray 155 and simplifies insertion and removal of PODS apparatuses 125 into and from a PODS shell 110 (e.g. refer FIG. 8F).

FIG. 8D is a front view of the PODS structure 115 of FIG. 1E and showing an alternative handle means 158 to that of FIG. 8A in profile. In this embodiment, the handle means 158 is part of the tray 155. Shown is a tray 155 in position within a PODS shell 110. FIG. 8F is an exploded perspective view of the PODS structure 115 of FIG. 8D, showing PODS apparatuses 125, a tray 155 and a PODS shell 110. FIG. 8G is a perspective view of the PODS structure 115 of FIG. 8E in an assembled state.

Other arrangements of handle means 158 are discussed in further detail below, in which the handle means also functions as a type of housing designed to protect the plant crown (which bears consumable plant parts) from unnecessary contact.

In an embodiment, the engagement means 140 is one or more recesses 144 positioned around the upper perimeter or lip of the outer PODS device 130 (refer FIGS. 3D and 3E). The one or more recesses 144 fit with corresponding projections 142 on the upper perimeter or lip of the PODS shell 110. Alternatively, the lip of the PODS apparatus 125 can bear projections (e.g. a flange such as item 148 in FIG. 18A or one or more projections) that engage with recesses on the PODS shell 110 (e.g. refer FIG. 18E). The engagement of projections and recesses prevents the PODS apparatus from exiting from the PODS shell and also secures the PODS apparatus in an upright position.

FIGS. 18D and 18E show various embodiments of a PODS shell 110 suitable for use with the hydroponic PODS apparatus 125 of FIGS. 18A to 18C. The PODS shell 110 of FIG. 18D is similar in form to the PODS shell 110 of FIGS. 1B and 2B, including engagement means as depicted in those figures. FIG. 18E shows an alternative embodiment of a PODS shell 110—depicted in this figure as a shell capable of receiving three PODS apparatuses 125. This embodiment may also be made so it is capable of receiving other numbers of PODS apparatuses—for example, from one to six.

The PODs apparatuses 125 are held in an upright position by engagement means 140. The engagement means 140 of the PODS shell of FIG. 18E differs from the engagement means of FIGS. 1B and 2B in that it comprises a recess 147 in the PODS shell 110 through which the PODS apparatus 125 can drop. A flange, projection or overhang 148 around the lip or upper rim of the outer PODS device 130 engages the rim of the recess 147 to secure the PODS apparatus 125 in position in the PODS shell 110—even if the PODS shell 110 is not filled to capacity. This embodiment of the PODS shell 110 can also be used to form a larger PODS structures or modular PODS superstructures, as described earlier in this document.

FIGS. 10A to 10F, 11A to 11F, 18A to 18E, 19A to 19E, and 20A show PODS apparatuses that include various arrangements of a housing 500 that extends over and/or around the plant crown. The housing 500 may be any suitable shape and form (3D shape) to accommodate a plant crown. FIG. 10A is a perspective view of a single-plant PODS apparatus showing a simple housing that sits on the upper edge of the inner PODS device or the upper edge of the outer PODS device 130, forming a mini-hothouse. The housing 500 may also include slots, holes, slits, perforations or any other suitably formed vent to minimise condensation within the PODS apparatus.

The housing 500 is either formed (e.g. thermoformed or injection moulded as shown in FIG. 20A) as a single piece with or otherwise engages the inner and/or outer PODS devices 120, 130 so that it forms a firmly fixed part of the PODS apparatus and can sufficiently withstand handling (including being loaded by goods in a shopping trolley, accidental bumping or falling over). This provides protection against contact to the consumable plant parts inside the housing, which assists in minimising the risk of physical damage and/or microbial contamination.

Alternative exemplary arrangements of the housing 500 are illustrated. These arrangements include a vertically planar portion such that the housing at least partially encloses a plant contained within—these include completely enclosed versions (e.g. FIGS. 10A to 10F, 11A and 11B) to partially enclosed (e.g. FIGS. 11C to 11F, 12A to 12E, 13A to 13C, 18A to 18C, 19A to 19E), including hinged versions (e.g. FIGS. 10D, 10F, 11D, 11F, 12C, 18C and 19B) that are openable to give access to the plant and closed with a press fit or snap fit closure (e.g. FIGS. 10E, 10F, 11C, 11D, heat crimp (e.g. FIGS. 11A and 11B) or glue (e.g. FIGS. 11E, 11F).

Referring to FIGS. 18 to 20, embodiments of the PODS system 100 also include a PODS apparatus 125 suitable for hydroponic use. Apart from the relative height of the PODS apparatus (including the height of the inner and outer PODS devices) to the housing 500, the features of the hydroponic PODS apparatuses are the same as for non-hydroponic versions.

FIGS. 18A and 18B are perspective and front views of an embodiment of an hydroponic PODS apparatus. FIG. 18C is an exploded view of the PODS apparatus of FIGS. 18A and 18B. As with non-hydroponic versions, the PODS apparatus comprises an inner PODS device 120 and an outer PODS device 130. Also depicted is the anti-spill device 700 of FIG. 13G and housing 500. The housing 500 of the embodiment of FIG. 18C is the same as the housing 500 of the embodiment of FIG. 11F, other than in relation to the relative height of the housing to the rest of the PODS apparatus. In the PODS apparatus of FIG. 18C, the housing 500 is a relatively greater proportion of the total height of the PODS apparatus than in the embodiment of FIG. 11F because hydroponic versions of the PODS apparatus do not require the same volume of growing medium as non-hydroponic versions.

The housing 500 may be detachable. This can be achieved by any suitable means. Exemplary arrangements to achieve detachability include:

(a) perforations at or near the hinge to allow the housing 500 to be detached (e.g. see FIGS. 11E to 11G showing a housing 500 in a closed state in FIG. 11E, then opened in FIG. 11F, then detached in FIG. 11G. An exemplary hinge is labelled 510 in FIGS. 11F, 12C, 19B);

(b) a push-button release 2410 to release the housing 500 from engagement with an outer PODS device 130 (e.g. as shown in FIGS. 24A and 24B). Alternatively, a push-button release may be used to disengage housing from an inner PODS device to achieve the same effect.

Referring to FIG. 24A, a perspective view is shown of the housing 500 firmly fixed to an outer PODS device 130. Engagement of the housing 500 to the PODS device 130 is achieved by a catch 2420 positioned at the upper rim of an outer PODS device 130 (refer FIGS. 24A and 24B). The catch 2420 hooks the push-button release 2410 when it is in its engaged state (FIGS. 24A, 24B and 24C). This prevents detachment of the housing 500 from the outer PODS device 130.

Depressing the push-button release 2410 allows the button 2410 to exit up and out through the catch 2420 (by sliding through a slot 2430 that travels through the catch 2420 (refer FIGS. 24C and 24D). FIG. 24D shows the push-button release in a disengaged state after release (FIG. 24C) from the outer PODS device 130. The push-button release 2410 can be redeployed after disengaging by folding the button 2410 up into its engaged stage and sliding the button 2410 through the slot 2430 of the catch 2420 until it "clicks" or catches. The housing 500 is now attached (engaged) to the outer PODS device 130.

This engagement mechanism (a catch and corresponding push-button release) can also be utilised for various alternative embodiments of the housing 500 e.g. as depicted in FIGS. 11, 12, 13, 17, 20.

Similar to the arrangements of housing depicted in other figures (e.g. FIGS. 10C to 10F, 11C to 11G, 12A to 12E, 13A to 13C, 17E, 18A to 18C, 19A to 19E, 20), the housing 500 of FIG. 24 may also be openable to give ready access to the crown of a plant. The two parts of the housing 500 in FIG. 24E snap or click fit together—for example, as in FIG. 24E.

In some embodiments (e.g. FIGS. 10E, 10F, 11C to 11F, 18A to 18C, 19A and 19B), the housing 500 includes discrete handle means 158 that facilitate handling of the PODS apparatus. In other embodiments (e.g. FIGS. 9D and 9E, 11A and 11B, 12A to 12E, 13A to 13C, 17E, 18A to 18E, 19C to 19E, 20, 24A to 24E), the handle means 158 is integral with the housing and simply means that a portion of the housing is usable for handling the PODS apparatus.

In either case, the housing 500 and in particular any handle means 158, also functions as a form of cage or roll bar to protect the plant crown during handling and transport (e.g. FIGS. 11C to 11F, 12A to 12E, 13A to 13C). In the embodiment of FIGS. 19A and 19B, the handle means 158 incorporates a widened portion or sleeve 159 that encircles the consumable parts of the plant when the housing 500 is in a closed state (refer FIG. 19A).

In the embodiments of FIG. 19C, the sleeve 159 and handle means 158 are discrete from each other. In the embodiment of FIG. 19D, the sleeve 159 is positioned around the handle means 158 and plant from above to form the embodiment of FIG. 19C. A flange 160 at the base of the sleeve 159 engages the upper rim of the PODS apparatus from above to secure the sleeve 159 in position. Alternatively, the sleeve 159 can be slid onto the PODS apparatus from below (refer FIG. 19E) to form the embodiment of FIG. 19C. In this arrangement, a flange 160 at the base of the sleeve 159 catches the upper rim of the PODS apparatus from underneath. The flange 160 and upper rim of the PODS apparatus engage to secure the sleeve 159 in position.

Referring to FIG. 22, the invention also provides a method 2200 of manufacturing the outer PODS device 130 of FIGS. 11F and 18C. The outer PODS device 130 of FIGS. 11F and 18C is manufactured as a single piece rather than manufacturing the housing as a secondary process and attaching it to the outer PODS device 130. The method includes the steps of:

(a) making a tool for forming the outer PODS device 130 to the requisite shape using any suitable material (step 2210). The requisite shape is of an outer PODS device 130 and an openable housing 500 in two parts (labelled 158—these parts form the handle means when joined), each part 158 angled from the outer PODS device 130 as shown in FIG. 20A;

(b) applying a sheet of suitable material (e.g. paper mulch or plastic) to the tool to form a housing 500 and an outer PODS device 130 in one piece, wherein the housing 500 adjoins the outer PODS device 130 in two parts (each labelled 158), each part via a living hinge. The material is applied to the tool by thermoforming or paper mulching, or injected into a mould or any other suitable means (step 2220).

The angle between the PODS shell and the housing (labelled X in FIG. 20A) provides rigidity to the form of the housing 500 (i.e. to the handle means 158). Preferably the angle is between 30 and 60 degrees and ideally around 45 degrees. The angle also allows the formed product to be removed from the tool without an undercut.

FIG. 20C shows various suitable side profiles of the handle means 158, taken along line B-B of FIG. 20B. The handle means 158 can be of any side profile with three-dimensional geometry, such as the examples labelled 158 depicted in FIG. 20C. Together, the 3D form of the side profile and the angled shape of the handle means 158 provide rigidity to the housing 500. This rigidity is important to protect the plant crown when the housing means is in a closed state. In each example shown in FIG. 20C, the profile is capable of nesting within itself when the handle means 158 are brought together to bring the housing 500 into a closed state.

In embodiments the housing 500 further contains a hang-sell device 520. Two variations of a hang-sell device are shown in FIG. 12. In FIG. 12A, the hang-sell device 520 is a depression in the handle means 158 of the housing 500 sufficient to enable the PODS apparatus to be displayed by hanging. In FIG. 12B, the hang-sell device 520 is a tab secured around the handle means 158 of the housing 500.

In yet another arrangement, the housing 500 forms a handle that doubles as a hang-sell device (e.g. FIGS. 12A to 12C). This allows the consumable plant to be hung (for space efficiency) and handled by the housing 500. This is an advantage over potted herbs that are displayed for retail sale on a table or shelf, as they are unable to be hung or stacked. Further, handling pots that are packed in open sleeves can damage flowers, leaves or stems as the bags offer no protection against heavy loads placed on top of the plants (e.g. other grocery goods) or physical damage from dropping or tipping over plants.

In an embodiment, the PODS apparatus further includes an anti-spill device that secures a plant within the PODS apparatus and prevents the entire root ball (and plant) from evacuating the pot if the pot tips over or is dropped. By holding the root ball in position, the anti-spill device also assists to prevent loose growing medium on the surface from spilling out from the pot. FIG. 13 shows exemplary embodiments of an anti-spill device 700. In an embodiment, the anti-spill device 700 is a mesh (that may be made of any suitable hole size and shape) that engages the upper edge of the inner PODS device 120 (FIGS. 13A and 13C). The inner PODS device 120 is engaged in position within the outer PODS device 130 through an engagement means (as described above).

The anti-spill device 700 may also take other forms such as a fine mesh (FIG. 13F), a grate-like form (FIGS. 13A, 13C, 13H and 13I), or even a thin layer of cloth (FIGS. 13D and 13E)—that is, any suitable means to prevent the exit of the rootball from the inner PODS device. The anti-spill device firmly engages with the upper rim of an inner PODS device (or alternatively with that of the outer PODS device or of the PODS shell) by any suitable devices. Exemplary arrangements are depicted in FIG. 13, as outlined below:

(a) a rubberised edge (item 730 in FIG. 13F) to snap fit the anti-spill device 700 (in this example, over the edge of the inner PODS device (or the edge of the PODS shell), (b) a grate-like form (e.g. FIG. 13G) that snap fits over the edge (item 740 shows a raised rim that sits over the rim of an inner PODS device; item 720 is a snap fit device to secure the anti-spill device on the rim of inner PODS device thereby preventing movement in an upward or downward direction), (c) a thin layer of cloth with a large weave sealed, snap fitted (e.g. FIG. 13E shows snap fit apparatus 720 on the rim of the anti-spill device 700), glued or stapled (e.g. item 710 in FIG. 13D is a staple) to the edge of the inner PODS device, (d) a grate-like in form with a central opening to allow for plants to be planted within the inner PODS device as seedlings (e.g. FIG. 13H and 13I). FIG. 13I shows an exploded view of the anti-spill device of FIG. 13H. The anti-spill device depicted has a plurality of lugs that slot into corresponding slots on the upper rim of the inner PODS device.

Referring to FIG. 13B, an exploded view of the PODS apparatus of FIG. 13A shows the relative positioning of the anti-spill device 700 (in this case a square mesh) to the inner PODS device 120, the PODS shell 130 and the housing 500. FIG. 18C shows a similar view of an anti-spill device on an exemplary hydroponic PODS apparatus (in this example, the PODS apparatus of FIG. 18A).

Referring to FIG. 14, the PODS apparatus includes a welling device 800. FIG. 14B shows a cross section of an inner PODS device 120, taken along line A-A of FIG. 14A. The base 810 of the inner PODS device 120 has multiple levels forming a stepped arrangement from the centre to the periphery (refer FIGS. 14B to 14I for various views that illustrate the differing levels of the base). FIGS. 14A to 14D show an embodiment of the welling device 800, in which the welling device 800 provides a source of water sitting around the periphery of the base 810 of the inner PODS device 120. FIGS. 14E to 14I show an alternative embodiment, in which the levels of the base 810 divide the welling device 800 into quadrants—one source of water in each corner of the base 810.

In an embodiment, the base 810 contains one or more holes 820 and is higher in the centre than at the periphery. The change in levels forms a "well" (a source of liquid, e.g. water and/or nutrients) at the periphery, which captures a volume of liquid. The volume will differ according to the size of the PODS apparatus. The welling device has a vertical height proportional to entire height of pot, preferably between 5% and 20%, ideally around 10%, of the pot height. The inner PODS device 120 is recessed from the outer PODS device 130 i.e. is shorter than outer PODS device 130 by sufficient height to prevent growing medium from spilling or washing over the PODS apparatus. In other words, the outer PODS device is deeper than the inner PODS device and as such has a larger internal volume than the inner PODS device. Any overflow of water flows back in—this assists in minimising mess. Most excess water from plant watering escapes through the holes 820 but where the level of the base is lower (i.e. at the periphery), water is captured and accessible to the plant roots. This welling device 800 assists in maintaining even water levels and preventing dehydration. The holes 820 reduce the risk of water logging, which may be fatal to a plant.

FIGS. 15A to 15D show various alternative exemplary arrangements of holes 820 and at least one stepped level (forming a welling device) in the base 810 of an inner PODS device. In these examples, the welling device is divided into quadrants.

When an inner PODS device is seated within an outer PODS device, the outer PODS device forms a well or source of liquid (e.g. water or liquid nutrients in the case of a hydroponic PODS apparatus). The outer PODS device also collects seepage and thereby prevents leakage of liquid and seepage of debris from the PODS apparatus onto an external surface. This is an advantage when the PODS apparatus is used indoors or in a vertical or hanging garden. If the PODS apparatus is placed within a PODS shell, further protection from mess and spillage is provided. The PODS shell can also provide a secondary well.

In an embodiment, the PODS apparatus includes a liquid level indicator that allows the level of excess or welled liquid to be seen. The liquid level indicator includes a clear window or part of the PODS apparatus (including through the inner and outer PODS devices) so that the level of liquid trapped within the PODS apparatus can be seen. In an arrangement the entire PODS apparatus is clear so that the liquid level is visible at all times. The liquid level indicator may also include markings to warn consumers when liquid levels are too high (and therefore pose a risk to the health of the plant).

The invention also provides a new method for storing and replenishing consumable plants, being plants that need to be replenished frequently. The method involves individually arranging groups of plants and storing them in an orderly arrangement. The orderly arrangement permits ready assessment of current stocks and an efficient method to replenish depleted stock. Referring to FIG. 16, the method 1600 of replenishing consumable plant stock is achieved by the steps of:

(a) arranging one or more PODS apparatuses to form a PODS structure according to individual wishes (step 1620). The PODS structure may be a single PODS apparatus or an arrangement of two or more PODS apparatuses (step 1610). PODS structures can be modified or built on in modular fashion, to form modular PODS superstructures, thereby providing flexibility in use (ornamental and/or functional garden), and in positioning;

(b) populating each PODS apparatus with one or more consumable plants, each plant being in an inner PODS device housed in an outer PODS device;

(c) removing a PODS apparatus from its position within a PODS shell (as those components are described above) once depleted, wasted or otherwise ready for replacement, without the need to dig up growing medium—refer step 1630;

(d) placing a PODS apparatus containing a replenished supply of plant consumables (leaf, flower, stem, core)—i.e. a new plant, ready to be "consumed"—in the available space within a PODS shell—refer step 1640;

(e) positioning the PODS apparatus relative to engagement means so as to secure the PODS apparatus in an upright position. The PODS apparatus is secured in an upright position on a tray or within a PODS shell via engagement means for storage and transportation.

The method may also include a step of removing the removable housing from the PODS apparatus once the inner PODS device is in position (e.g. by tearing away housing along a perforated hinge, or sliding the housing away from the PODS apparatus). This should take place after transportation of the PODS apparatus to the home.

In an embodiment, the method of storage includes the further step of watering the consumable plants on a regular basis and using the liquid level indicator to reduce the risk of overwatering or overfeeding with liquid nutrients.

The invention further provides a method and device for transplanting plants from a hydroponic garden to an external environment. Referring to FIG. 21, the PODS system 100 further includes an alternative embodiment of a PODS apparatus 125 than described above. This embodiment is a device for transplanting plants from a hydroponic garden.

FIG. 21A shows an exploded view of this embodiment, which includes an inner PODS device 120 and an outer PODS device 130. The inner PODS device 120 is fitted with an anti-spill device 700. The anti-spill device 700 can be as described above, or be continuously formed as part of the inner PODS device 120. The outer PODS device 130 has an overhang or flange 148 around its upper rim. FIG. 21B shows an assembled view of the PODS apparatus 125, with the inner PODS device 120 positioned within an outer PODS device 130.

The inner PODS device 120 is open at its base and is positioned in a hydroponic garden as shown in FIG. 21C. A plant 2100 can be seen growing up through the anti-spill device 700 of the inner PODS device 120. The roots 2110 of the plant 2100 sit in nutrient solution 2120 while the crown of the plant protrudes through a buoyant plastic sheet 2130 that prevents the fluid level from dropping below the roots 2110.

The inner PODS device 120 protects the rootball 2110 of a plant 2100 as the plant grows (refer step 2310). The anti-spill device 700 assists to secure the plant 2100 to the inner PODS device 120. Referring to FIG. 23, the method 2300 of transplanting a plant from a hydroponic garden to an external environment includes the step of handling the plant using the inner PODS device of FIG. 21, which allows handling without disturbing the rootball. The plant and inner PODS device 120 can be:

(a) removed from the hydroponic garden using the inner PODS device 120 (step 2320); and then (b) placed directly into an outer PODS device 130 to form a PODS apparatus 125 (step 2330). The PODS apparatus is secured in an upright position on a tray or within a PODS shell via engagement means for storage and transportation.

The outer PODS device 130 of the embodiment of FIG. 21 includes a welling device. The welling device is as depicted in FIGS. 14A to 14D (namely, a well created by varying levels at the base of an inner PODS device 120), but could equally be a welling device into portions (e.g. quadrants, as depicted in FIGS. 14E to 14I and FIG. 15 or any other number of portions). The welling device stores and provides an additional source of liquid nutrient to assist in maintaining the quality of the plant during transportation and storage.

The inner PODS device 120 of FIG. 21 is positioned in an outer PODS device 130 to form a PODS apparatus, which protects the rootball and capture excess liquid. The PODS apparatus is secured in an upright position by engagement means in the form of a tray that engages the overhang 148 of the PODS shell 130 to secure the PODS apparatus in an upright position. Alternatively, the outer PODS device provides projections for engagement with recesses on a tray such as depicted in FIGS. 9D and 9E.

The orderly and modular arrangements of a plurality of plants can be achieved by positioning one or more PODS apparatuses within a PODS shell (such as the PODS shell of FIG. 18D or 18E), with or without the use of a tray, and/or by combining the PODS apparatuses with other modular components to form larger modular PODS superstructures such as those depicted in FIGS. 6 and 7.

Any of the trays depicted in FIGS. 1C to 1E and FIGS. 8A to 8G could be formed without deep recesses but with holes so that the PODS apparatus 125 of FIG. 21B can be held by the tray within any of the PODS shells 110 of FIGS. 1C to 1E and FIGS. 8A to 8G. The tray may rest on or otherwise engage with (e.g. snap fit or click in at points around the rim) the upper rim of the PODS shells.

An advantage of the PODS, system and method is that it provides a useful alternative to buying cut plants. The PODS, system and method maintains the consumable plant parts (leaves, flowers, core, stem) in a "living" rather than "cut" state. In this way, the PODS system overcomes at least some of the quality and safety problems associated with cut plants.

As the PODS system, apparatus and method is mainly concerned with consumable plants that need to be replenished frequently (days to months) rather than plants intended to live for a significant time (years), it provides a useful and attractive alternative storage solution for such plants, which are typically stored in their original disposable containers. This alternative storage solution reduces mess and the risk of spillage over conventional plant storage systems.

The PODS system and apparatus allows the ornamental display of groups of plants without the need to harvest the consumable parts (e.g. flowers, leaves such as herbs) from the plant. It also allows the ornamental display of plants (including flowers) otherwise unsuitable for cutting (e.g. flowers with stems insufficient for standing in a vase), so increasing the range of plants available for ornamental display. Although originally conceived for dealing with consumable plants, the PODS system and apparatus is also suitable for the storage and display of more durable plants such as ferns and succulents, for ornamental purposes.

The PODS system and apparatus has a further advantage of allowing groups of plants or flowers to be arranged for display within a single ornamental arrangement. This allows different design possibilities than either groups of potted plants or arrangements of cut flowers. It further provides the advantage of allowing consumable plants to be efficiently added or removed from the ornamental display as desired. This can be achieved by changing individual PODS apparatuses, selecting various PODS shells and/or by changing the overall PODS structure (by adding or removing individual PODS apparatuses, selecting and combining different PODS shells, accessories or other components in modular fashion, including to form modular PODS superstructures). An advantage of the modular PODS superstructures is they provide a cost efficient alternative to building a vertical garden or ornamental garden, including water features.

In an embodiment, the PODS system and apparatus also addresses the risk of damage or contamination through contact to consumable plant parts (e.g. leaves, stem, flowers, core) by providing a housing that extends over and/or around the plant crown. The housing may also catch spillage, prevent a plant from being evacuated entirely from the pot if overturned and reduce mess from leakage and seepage.

The PODS system, apparatus and method provide an alternative to cut plants by providing a storage mechanism that prolongs the life of consumable plant parts ("living" versus "cut") and in so doing assists to meet the market for consumable plants while addressing at least some of the quality and safety problems posed by cut plants. The PODS system meets a need in a market for consumable plants, rather than the market for durable plants, which do not suffer the same disadvantages as plants that need to be replenished on a regular basis.

It will be appreciated that the invention is not restricted to these particular fields of use and that it is not limited to particular embodiments or applications described herein.

Comprises/comprising when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to.

The invention claimed is:
1. A modular plant-on-display and storage (PODS) system comprising:
(a) a PODS shell capable of receiving one or more PODS apparatuses,
wherein each of said one or more PODS apparatuses is engageable with the PODS shell, and
wherein each of said one or more PODS apparatuses comprises:
i. an inner PODS device, the inner PODS device having a base and an internal volume for receiving one or more plants therein;
ii. an outer PODS device, the outer PODS device having a larger internal volume for receiving said inner PODS device,
wherein the outer PODS device is deeper than the inner PODS device such that the outer PODS device has a larger internal volume than the internal volume of said inner PODS device, and
wherein the outer PODS device acts as a first barrier to seepage, collecting seepage from the inner PODS device of one or more of:
A. growing medium; or
B. liquid;
(b) engagement means to retain the one or more PODS apparatuses upright within the PODS shell, wherein said engagement means includes one or more projections extending from a first component of the PODS system for engagement with one or more depressions correspondingly positioned and formed within a second component of the PODS system;
and each of the first component and the second component, respectively, includes one of the following:

(a) a PODS apparatus of the one or more PODS apparatuses or a part thereof; or
(b) the PODS shell;
wherein said projections and said depressions each includes stepped levels, and wherein respective profiles of said projections and said depressions are offset but otherwise identical,
wherein said offset profiles of the stepped levels of corresponding depressions and projections facilitate engagement of said PODS apparatus upright with said PODS shell,
wherein the PODS shell is deeper than any PODS apparatus contained therein such that when the PODS apparatus is engaged in position within the PODS shell, the PODS shell acts as a second barrier to seepage, collecting seepage from each PODS apparatus,
wherein the PODS system further includes a welling device for regulating liquid volume, the welling device comprising:
A. a planar base platform of the inner PODS device containing one or more holes for the liquid to escape;
B. a closed lower peripheral base disposed at a lowermost portion of said inner PODS device and extending continuously about a periphery of said inner PODS device; and
C. one or more stepped levels extending between said base platform and said lower peripheral base of said inner PODS device and surrounding the base platform said welling device creates a storage source of the liquid at said periphery such that the liquid is at all times accessible to the one or more plants within the inner PODS device; and
wherein said one or more stepped levels of the welling device also form part of said engagement means,
wherein in use, the PODS shell accommodates an arrangement of said one or more plants such that the PODS system provides a customisable solution for storage or display of said one or more plants, said system retaining said one or more plants upright and collecting seepage to reduce mess associated with storing or displaying said one or more plants, and
wherein each PODS apparatus is removable from the PODS shell, such removal effecting removal of the one or more plants from said arrangement, such that mess associated with removing or replacing the one or more plants is reduced.

2. The modular plant-on-display and storage (PODS) system of claim 1 wherein said first and second components have upper portions, and the engagement means engages the first component with respect to the second component at one or more of the following:
(a) their respective bases;
(b) their respective upper portions.

3. The modular plant-on-display and storage (PODS) system of claim 1 further including an anti-spill device for protecting against exit of a plant rootball from the inner PODS device.

4. The modular plant-on-display and storage (PODS) system of claim 3 wherein the anti-spill device includes one of:
(e) a grate-like form;
(f) a layer of cloth engageable with an upper rim of one or more of:
i. the inner PODS device;
ii. the outer PODS device; and;
iii. the PODS shell.

5. The modular plant-on-display and storage (PODS) system of claim 1 further including an housing for protecting one or more of:
(g) a plant crown;
(h) consumable plant parts
of a plant housed within the one or more PODS apparatuses.

6. The modular plant-on-display and storage (PODS) system of claim 5 wherein the housing includes a rigid form of any suitable shape that is secured to extend from one side of a PODS apparatus of the one or more PODS apparatuses to an opposing side of the PODS apparatus over the plant crown such that the rigid form protects the plant crown.

7. The modular plant-on-display and storage (PODS) system of claim 5 wherein the housing is detachable.

8. The modular plant-on-display and storage (PODS) system of claim 5 wherein the housing includes a substantially vertically planar portion such that the housing at least partially encloses the one or more plants.

9. The modular plant-on-display and storage (PODS) system of claim 1 further including one or more of the following:
(i) a joiner device such that:
i. each of the one or more PODS apparatuses is joinable to one or more further of the one or more PODS apparatuses to form one or more PODS structures;
ii. each of said one or more PODS structures is joinable to one or more further of the one or more PODS structures to form a PODS superstructure;
iii. each of said one or more PODS structures is joinable to
(j) a mounting device to secure one or more of:
iv. the one or more PODS structures; and
v. the PODS superstructure to a vertical or horizontal surface.

10. The modular plant-on-display and storage (PODS) system of claim 9 wherein the joiner device includes a water feature that flows to a water drain.

11. The modular plant-on-display and storage (PODS) system of claim 9 wherein the mounting device includes one or more of:
(k) a balcony frame;
(l) a hanging frame; and
(m) a hook.

12. The plant-on-display and storage (PODS) system of claim 1 wherein the PODS system further includes one or more of the following accessories, wherein each of said one or more accessories is mountable on to a component of the PODS system for storage:
(n) a water jug;
(o) a pair of scissors; and
(p) a tool holder.

13. The plant-on-display and storage (PODS) system of claim 1 in which said engagement means also functions as an additional welling device.

14. The modular plant-on-display and storage (PODS) system of claim 1 wherein a vertical height of the welling device is between 5% and 20% of a vertical height of the inner PODS device.

* * * * *